United States Patent
Malshe

(10) Patent No.: US 9,902,918 B2
(45) Date of Patent: *Feb. 27, 2018

(54) NANO-TRIBOLOGY COMPOSITIONS AND RELATED METHODS INCLUDING HARD PARTICLES

(71) Applicant: The Board of Trustees of the University of Arkansas, North Little Rock, AZ (US)

(72) Inventor: Ajay P. Malshe, Springdale, AZ (US)

(*) Notice: Subject to any disclaimer, the term of this patent is extended or adjusted under 35 U.S.C. 154(b) by 470 days.

This patent is subject to a terminal disclaimer.

(21) Appl. No.: 14/302,030

(22) Filed: Jun. 11, 2014

(65) Prior Publication Data

US 2014/0364348 A1   Dec. 11, 2014

Related U.S. Application Data

(63) Continuation-in-part of application No. 13/921,640, filed on Jun. 19, 2013, now Pat. No. 9,499,766, which is a continuation of application No. 12/160,758, filed as application No. PCT/US2007/060506 on Jan. 12, 2007, now Pat. No. 8,492,319.

(Continued)

(51) Int. Cl.
  C10M 161/00 (2006.01)
  C10M 169/00 (2006.01)
  (Continued)

(52) U.S. Cl.
  CPC ......... C10M 169/04 (2013.01); B05D 3/007 (2013.01); C09D 7/1216 (2013.01);
  (Continued)

(58) Field of Classification Search
  CPC ............. C10M 125/22; C10M 169/04; C10M 171/06; C10M 177/00; C10M 2201/04; C10M 2201/041; C10M 2201/042; C10M 2201/06; C10M 2201/61; C10M 2201/062; C10M 2201/065; C10M 2201/066; C10M 2201/081; C10M 2201/082;
  (Continued)

(56) References Cited

U.S. PATENT DOCUMENTS 3,172,802 A   3/1965   Rosenblad
3,666,662 A   5/1972   Lowe
(Continued)

FOREIGN PATENT DOCUMENTS

CN   1080648   1/1994
EP   1980609   10/2008
(Continued)

OTHER PUBLICATIONS

Gustavsoon et al., Nanoparticle based and sputtered WS2 low-friction coatings—Differences and similarities with respect to friction mechanisms and tribofilm formulation, Surface and Coating Technology, vol. 232, pp. 616-626, Oct. 15, 2013.
(Continued)

*Primary Examiner* — Latosha Hines
(74) *Attorney, Agent, or Firm* — Akerman LLP; Stephen C. Glazier

(57) ABSTRACT

Compositions having a plurality of hard particles and a plurality of lubricant nanoparticles are disclosed. Methods of making and using the compositions are also disclosed.

61 Claims, 15 Drawing Sheets

Related U.S. Application Data

(60) Provisional application No. 60/758,307, filed on Jan. 12, 2006.

(51) Int. Cl.

| | | |
|---|---|---|
| *C10M 169/06* | (2006.01) | |
| *C10M 169/04* | (2006.01) | |
| *C10M 171/06* | (2006.01) | |
| *C10M 125/22* | (2006.01) | |
| *B05D 3/00* | (2006.01) | |
| *C09D 7/12* | (2006.01) | |
| *C10M 177/00* | (2006.01) | |

(52) U.S. Cl.
CPC ...... *C10M 125/22* (2013.01); *C10M 169/042* (2013.01); *C10M 171/06* (2013.01); *C10M 177/00* (2013.01); *C10M 2201/04* (2013.01); *C10M 2201/041* (2013.01); *C10M 2201/042* (2013.01); *C10M 2201/06* (2013.01); *C10M 2201/061* (2013.01); *C10M 2201/062* (2013.01); *C10M 2201/065* (2013.01); *C10M 2201/066* (2013.01); *C10M 2201/0663* (2013.01); *C10M 2201/081* (2013.01); *C10M 2201/082* (2013.01); *C10M 2201/084* (2013.01); *C10M 2201/087* (2013.01); *C10M 2201/103* (2013.01); *C10M 2203/0206* (2013.01); *C10M 2203/1006* (2013.01); *C10M 2203/1025* (2013.01); *C10M 2205/163* (2013.01); *C10M 2207/0406* (2013.01); *C10M 2207/1285* (2013.01); *C10M 2207/2815* (2013.01); *C10M 2207/2835* (2013.01); *C10M 2207/2895* (2013.01); *C10M 2207/401* (2013.01); *C10M 2213/046* (2013.01); *C10M 2213/062* (2013.01); *C10M 2215/0813* (2013.01); *C10M 2223/10* (2013.01); *C10M 2223/103* (2013.01); *C10M 2229/025* (2013.01); *C10N 2210/02* (2013.01); *C10N 2210/03* (2013.01); *C10N 2210/04* (2013.01); *C10N 2210/08* (2013.01); *C10N 2220/082* (2013.01); *C10N 2230/06* (2013.01); *C10N 2230/56* (2013.01); *C10N 2250/10* (2013.01); *C10N 2250/14* (2013.01); *C10N 2270/00* (2013.01); *Y10T 428/2982* (2015.01)

(58) Field of Classification Search
CPC ...... C10M 2201/084; C10M 2201/087; C10M 2203/103; C10M 2203/0206; C10M 2203/1006; C10M 2203/1025; C10M 2205/163; C10M 2207/0406; C10M 2207/1285; C10M 2207/2815; C10M 2207/2835; C10M 2207/2895; C10M 2207/401; C10M 2213/046; C10M 2213/062; C10M 2215/0813; C10M 2223/10; C10M 2223/103; C10M 2229/025; C10N 2210/02; C10N 2210/03; C10N 2210/04; C10N 2210/08; C10N 2220/082; C10N 2230/06; C10N 2230/56; C10N 2250/10; C10N 2250/14; C10N 2270/00; Y10T 428/2982
USPC .......................................... 508/117, 155, 168
See application file for complete search history.

(56) References Cited

U.S. PATENT DOCUMENTS

| | | |
|---|---|---|
| 3,883,314 A | 5/1975 | Schnyder et al. |
| 4,105,571 A | 8/1978 | Shaub et al. |
| 4,168,241 A | 9/1979 | Kozima et al. |
| 4,223,958 A | 9/1980 | Gray |
| 4,334,928 A | 6/1982 | Hara et al. |
| 4,715,972 A | 12/1987 | Pacholke |
| 4,745,010 A | 5/1988 | Sarin et al. |
| 4,816,334 A | 3/1989 | Yokoyama et al. |
| 4,877,677 A | 10/1989 | Hirochi et al. |
| 5,129,918 A | 7/1992 | Chattopadhay |
| 5,273,790 A | 12/1993 | Herb et al. |
| 5,286,565 A | 2/1994 | Holzl et al. |
| 5,328,875 A | 7/1994 | Ueda et al. |
| 5,330,854 A | 7/1994 | Singh et al. |
| 5,352,501 A | 10/1994 | Miyamoto et al. |
| 5,363,821 A | 11/1994 | Rao et al. |
| 5,389,118 A | 2/1995 | Hinterman et al. |
| 5,391,422 A | 2/1995 | Omori et al. |
| 5,407,464 A | 4/1995 | Kaliski |
| 5,441,762 A | 8/1995 | Gray et al. |
| 5,466,642 A | 11/1995 | Tajima et al. |
| 5,478,622 A | 12/1995 | Nakamura et al. |
| 5,500,331 A | 3/1996 | Czekai et al. |
| 5,503,913 A | 4/1996 | Konig et al. |
| 5,523,006 A | 6/1996 | Strumban |
| 5,534,808 A | 7/1996 | Takaki et al. |
| 5,536,577 A | 7/1996 | Murayama et al. |
| 5,614,140 A | 3/1997 | Pinneo |
| 5,671,532 A | 9/1997 | Rao et al. |
| 5,677,060 A | 10/1997 | Terentieva et al. |
| 5,704,556 A | 1/1998 | McLaughlin |
| 5,766,783 A | 6/1998 | Utsumi et al. |
| 5,800,866 A | 9/1998 | Myers et al. |
| 5,830,577 A | 11/1998 | Murayama et al. |
| 5,830,813 A | 11/1998 | Yao et al. |
| 5,834,689 A | 11/1998 | Cook |
| 5,882,777 A | 3/1999 | Kukino et al. |
| 5,889,219 A | 3/1999 | Moriguchi et al. |
| 5,897,751 A | 4/1999 | Makowiccki et al. |
| 5,902,671 A | 5/1999 | Kutscher |
| 5,928,771 A | 7/1999 | Dewald, Jr. et al. |
| 5,945,166 A | 8/1999 | Singh et al. |
| 6,123,923 A | 9/2000 | Unger et al. |
| 6,146,645 A | 11/2000 | Deckers et al. |
| 6,183,762 B1 | 2/2001 | Deckers et al. |
| 6,196,910 B1 | 3/2001 | Johnson et al. |
| 6,210,742 B1 | 4/2001 | Deckers et al. |
| 6,217,843 B1 | 4/2001 | Homyonfer et al. |
| 6,258,139 B1 | 7/2001 | Jensen |
| 6,258,237 B1 | 7/2001 | Gal-Or et al. |
| 6,267,989 B1 * | 7/2001 | Liversidge ............ A61K 9/146 424/489 |
| 6,370,762 B1 | 4/2002 | Li et al. |
| 6,372,012 B1 | 4/2002 | Majagi et al. |
| 6,383,404 B1 | 5/2002 | Sakai et al. |
| 6,395,634 B1 | 5/2002 | Miyamoto |
| 6,410,086 B1 | 6/2002 | Brandon et al. |
| 6,484,826 B1 | 11/2002 | Anderson et al. |
| 6,540,800 B2 | 4/2003 | Sherman et al. |
| 6,544,599 B1 | 4/2003 | Brown et al. |
| 6,548,139 B2 | 4/2003 | Sakai et al. |
| 6,548,264 B1 | 4/2003 | Tan et al. |
| 6,607,782 B1 | 8/2003 | Malshe et al. |
| 6,652,967 B2 | 11/2003 | Yadav et al. |
| 6,709,622 B2 | 3/2004 | Billiet et al. |
| 6,710,020 B2 | 3/2004 | Tenne et al. |
| 6,878,676 B1 | 4/2005 | Migdal et al. |
| 6,895,855 B2 | 5/2005 | Doll |
| 6,933,049 B2 | 8/2005 | Wan et al. |
| 6,933,263 B2 | 8/2005 | Manka et al. |
| 6,945,699 B2 | 9/2005 | Tibbits |
| 6,951,583 B2 | 10/2005 | Clere et al. |
| 6,962,895 B2 | 11/2005 | Scharf et al. |
| 6,962,946 B2 | 11/2005 | Brady et al. |
| 6,976,647 B2 | 12/2005 | Reed et al. |
| 7,018,606 B2 | 3/2006 | Tenne et al. |
| 7,018,958 B2 | 3/2006 | Arrowsmith et al. |
| 7,022,653 B2 | 4/2006 | Hartley et al. |
| 7,244,498 B2 | 7/2007 | Cook et al. |
| 7,335,245 B2 | 2/2008 | He et al. |
| 7,371,474 B1 | 5/2008 | Liu et al. |

(56) References Cited

U.S. PATENT DOCUMENTS

| | | | |
|---|---|---|---|
| 7,372,615 B2 | 5/2008 | Chen et al. |
| 7,374,473 B2 | 5/2008 | Kumasaka et al. |
| 7,375,060 B2 | 5/2008 | Kuzmin et al. |
| 7,387,813 B2 | 6/2008 | Kumar et al. |
| 7,410,697 B2 | 8/2008 | Schneider et al. |
| 7,419,941 B2 | 9/2008 | Waynick |
| 7,430,359 B2 | 9/2008 | Chen et al. |
| 7,438,976 B2 | 10/2008 | He et al. |
| 7,449,432 B2 | 11/2008 | Lockwood et al. |
| 7,458,384 B1 | 12/2008 | Seal et al. |
| 7,463,404 B2 | 12/2008 | Chen et al. |
| 7,470,650 B2 | 12/2008 | Zhang et al. |
| 7,471,439 B2 | 12/2008 | Chen et al. |
| 7,494,907 B2 | 2/2009 | Brown et al. |
| 7,510,760 B2 | 3/2009 | Malshe et al. |
| 7,524,481 B2 | 4/2009 | Tenne et al. |
| 7,549,938 B2 | 6/2009 | Leighton et al. |
| 7,556,743 B2 | 7/2009 | Furman et al. |
| 7,571,774 B2 | 8/2009 | Shuster et al. |
| 7,580,174 B2 | 8/2009 | Chen et al. |
| 7,594,962 B2 | 9/2009 | Bujard et al. |
| 7,597,950 B1 | 10/2009 | Stellacci et al. |
| 7,614,270 B2 | 11/2009 | Luckey, Jr. et al. |
| 7,616,370 B2 | 11/2009 | Chen et al. |
| 7,641,886 B2 | 1/2010 | Tenne et al. |
| 7,687,112 B2 | 3/2010 | Buehler et al. |
| 7,704,125 B2 | 4/2010 | Roy et al. |
| 7,723,812 B2 | 5/2010 | Chen et al. |
| 7,749,562 B1 | 7/2010 | Lam et al. |
| 7,763,489 B2 | 7/2010 | Chen et al. |
| 7,767,632 B2 | 8/2010 | Esche, Jr. et al. |
| 7,768,366 B1 | 8/2010 | Patton et al. |
| 7,771,821 B2 | 8/2010 | Martin et al. |
| 7,790,658 B2 | 9/2010 | Sawyer et al. |
| 7,803,347 B2 | 9/2010 | Ajiri |
| 7,816,297 B2 | 10/2010 | Lee |
| 7,846,556 B2 | 12/2010 | Erdemir et al. |
| 7,871,533 B1 | 1/2011 | Haiping et al. |
| 7,952,786 B2 | 5/2011 | Chen et al. |
| 7,959,891 B2 | 6/2011 | Tenne et al. |
| 7,968,505 B2 | 6/2011 | Liu et al. |
| 7,994,105 B2 | 8/2011 | Narayan |
| 7,998,572 B2 | 8/2011 | McGilvray et al. |
| 8,048,526 B2 | 11/2011 | Mizrahi |
| 8,071,160 B2 | 12/2011 | Chinn et al. |
| 8,074,906 B2 | 12/2011 | Talton |
| 8,075,792 B1 | 12/2011 | Branz et al. |
| 8,076,809 B2 | 12/2011 | Tingler et al. |
| 8,114,373 B2 | 2/2012 | Jang et al. |
| 8,117,902 B2 | 2/2012 | Santore et al. |
| 8,221,828 B2 | 7/2012 | Chinn et al. |
| 8,322,754 B2 | 12/2012 | Carcagno et al. |
| 8,476,206 B1 | 7/2013 | Malshe |
| 8,486,870 B1 | 7/2013 | Malshe |
| 8,492,319 B2 | 7/2013 | Malshe et al. |
| 2004/0076572 A1 | 4/2004 | Clere et al. |
| 2004/0241442 A1 | 12/2004 | He et al. |
| 2005/0002970 A1 | 1/2005 | Ketelson et al. |
| 2005/0065044 A1 | 3/2005 | Migdal et al. |
| 2005/0124504 A1 | 6/2005 | Zhang et al. |
| 2005/0191357 A1 | 9/2005 | Kawashima et al. |
| 2005/0210755 A1* | 9/2005 | Cho ............ B21C 3/025 51/293 |
| 2005/0287348 A1* | 12/2005 | Faler ............ B32B 5/18 428/315.5 |
| 2005/0288192 A1* | 12/2005 | Alexander ........ B01J 13/0065 508/287 |
| 2006/0025515 A1 | 2/2006 | Scaringe et al. |
| 2006/0040832 A1 | 2/2006 | Zhang et al. |
| 2006/0056752 A1 | 3/2006 | Tibbits |
| 2006/0120947 A1 | 6/2006 | Tenne et al. |
| 2006/0199013 A1 | 9/2006 | Malshe et al. |
| 2006/0258875 A1 | 11/2006 | Reyes et al. |
| 2007/0004602 A1 | 1/2007 | Waynick |
| 2007/0009738 A1 | 1/2007 | Kumar et al. |
| 2007/0111319 A1 | 1/2007 | Bastide et al. |
| 2007/0158609 A1 | 7/2007 | Hong et al. |
| 2007/0158610 A1 | 7/2007 | Hong et al. |
| 2007/0262120 A1 | 11/2007 | Coleman et al. |
| 2007/0293405 A1 | 12/2007 | Zhang et al. |
| 2008/0029625 A1 | 2/2008 | Talton |
| 2008/0050450 A1 | 2/2008 | Arnold et al. |
| 2008/0066375 A1 | 3/2008 | Roos et al. |
| 2008/0161213 A1 | 7/2008 | Jao et al. |
| 2008/0234149 A1 | 9/2008 | Malshe et al. |
| 2008/0269086 A1 | 10/2008 | Adhvaryu |
| 2008/0287326 A1 | 11/2008 | Zhang et al. |
| 2009/0014691 A1 | 1/2009 | Kint et al. |
| 2009/0018037 A1 | 1/2009 | Mabuchi et al. |
| 2009/0042751 A1 | 2/2009 | Narayan |
| 2009/0048129 A1 | 2/2009 | Mabuchi et al. |
| 2009/0053268 A1 | 2/2009 | DePablo et al. |
| 2009/0074522 A1 | 3/2009 | Graham et al. |
| 2009/0118148 A1 | 5/2009 | Martin et al. |
| 2009/0155479 A1 | 6/2009 | Xiao et al. |
| 2009/0169745 A1 | 7/2009 | Nohr et al. |
| 2009/0170733 A1 | 7/2009 | Hwang et al. |
| 2009/0246285 A1 | 10/2009 | Stellacci et al. |
| 2010/0029518 A1 | 2/2010 | Markovitz et al. |
| 2010/0092663 A1 | 4/2010 | Ajiri |
| 2010/0099590 A1 | 4/2010 | Liu |
| 2010/0112073 A1 | 5/2010 | Sabliov et al. |
| 2010/0204072 A1 | 8/2010 | Kwon et al. |
| 2010/0227782 A1 | 9/2010 | Tenne et al. |
| 2010/0261625 A1 | 10/2010 | Hakamata |
| 2010/0298180 A1 | 11/2010 | Patel et al. |
| 2011/0052934 A1 | 3/2011 | Sugimoto et al. |
| 2011/0118156 A1 | 5/2011 | Ruhle et al. |
| 2011/0136708 A1 | 6/2011 | Mabuchi et al. |
| 2011/0166051 A1 | 7/2011 | Mizrahi et al. |
| 2011/0172132 A1 | 7/2011 | Branson et al. |
| 2011/0206596 A1 | 8/2011 | Tenne et al. |
| 2011/0229580 A1 | 9/2011 | Srivastava et al. |
| 2011/0244692 A1 | 10/2011 | Jeong et al. |
| 2011/0257054 A1 | 10/2011 | Baran, Jr. et al. |
| 2011/0287987 A1 | 11/2011 | Mordukhovich et al. |
| 2012/0032543 A1 | 2/2012 | Chakraborty et al. |
| 2014/0005083 A1 | 1/2014 | Malshe |
| 2014/0024565 A1 | 1/2014 | Malshe et al. |
| 2014/0038862 A1 | 2/2014 | Hague et al. |
| 2014/0364348 A1 | 12/2014 | Malshe |
| 2015/0132539 A1 | 5/2015 | Bailey |
| 2015/0361375 A1 | 12/2015 | Malshe |
| 2016/0046886 A1 | 2/2016 | Malshe |

FOREIGN PATENT DOCUMENTS

| | | | |
|---|---|---|---|
| JP | 63-040708 | 2/1988 | |
| JP | 10130678 | 5/1998 | |
| JP | 10195473 | 7/1998 | |
| JP | 10330779 | 12/1998 | |
| JP | 2002-294272 | 10/2002 | |
| JP | 0645350 | 2/2006 | |
| WO | 95/02025 | 1/1995 | |
| WO | 98/24833 | 6/1998 | |
| WO | 2005/060648 | 7/2005 | |
| WO | WO 2005060648 A2 * | 7/2005 | .......... C10M 125/02 |
| WO | 2006/076728 | 7/2006 | |
| WO | 2006/121553 | 11/2006 | |
| WO | 2006/134061 | 12/2006 | |
| WO | 2007/082299 | 7/2007 | |
| WO | 2014/008004 | 1/2014 | |
| WO | WO 2014/008006 | 1/2014 | |

OTHER PUBLICATIONS

JP Patent Office, Office Action dated May 25, 2015, from JP Patent Application No. 2014-095260 (with English Translation).
International Search Report, dated Oct. 16, 2015 in PCT/US15/27925.
Verma, Arpana, "Fundamental Understanding of the Synthesis and Tribological Behavior of Organic-Inorganic Nanoparticles", Dec. 2008, University of Arkansas, pp. 1-131.

(56) References Cited

OTHER PUBLICATIONS

Bakunin, V.N. et al., "Synthesis and application of inorganic nanoparticles as lubricant components—a review," J. Nanoparticle Res. (2004) 6:273-284.
Dmytryshyn, S.L. et al., "Synthesis and characterization of vegetable oil derived esters: evaluation for their diesel additive properties," Bioresource Tech. (2004) 92:55-64.
Hsu, S.M. et al., "Boundary lubricating films: formation and lubrication mechanism," Tribology Int'l. (2005) 38:305-312.
Hu, J.J. et al., "Synthesis and microstructural characterization of inorganic fullerene-like MoS2 and graphite-MoS2 hybrid nanoparticles," J. Mater. Res. (2006) 21(4):1033-1040.
Jiang, W. et al., "Cubic boron nitride (cBN) based nanocomposite coatings on cutting inserts with chip breakers for hard turning applications," Surface & Coatings Technology (2005) 200:1849-1854.
Li, B. et al., "Tribochemistry and antiwear mechanism of organic-inorganic nanoparticles as lubricant additives," Technology Letters (2006) 22(1):79-84.
Malshe, A.P. et al., "Nanostructured coatings for machining and wear-resistant applications," JOM (Sep. 2002) 28-30.
Menezes, P.L. et al., "Studies on friction and transfer layer: role of surface texture," Tribology Letters (Dec. 2006) 24(3):265-273.
Minami, I. et al., "Antiwear properties of phosphorous-containing compounds in vegetable oils," Tribology Letters (Aug. 2002) 13(2):95-101.
Moshkovith, A. et al., "Friction of fullerene-like WS2 nanoparticles; effect of agglomeration," Tribology Letters (Dec. 2006) 24(3):225-228.
Rao, C.N.R. et al., "Inorganic nanotubes," Dalton Trans. (2003) 1-24.
Russell, W.C. et al., "CBN—TiN composite coating using a novel combinatorial method—structure and performance in metal cutting," J. Mfg. Sci. Eng. (2003) 125:431-434.
Spikes, H., The thickness, friction and wear of lubricant films, a PowerPoint presentation given at the SAE Powertrain & Fluid Systems Conference and Exhibition, San Antonio, Texas (Oct. 25, 2005).
Verma, A. et al., "Exploring mechanical synthesis of inorganic nanoparticles of MoS.sub.2 lubricant and its composite with organic medium for advanced manufacturing," ISNM (2006) Paper No. 33.
Wu, J.-H. et al., "Bio-inspired surface engineering and tribology of MoS2 overcoated cBN—TiN composite coating," Wear (2006) 261(5-6):592-599.
Yedave, S.N. et al., "Novel composite CBN—TiN coating; synthesis and performance analysis," J. Mfg. Processes (2003) 5(2):154-162.
International Search Report and Written Opinion of International Searching Authority for Application No. PCT/US07/60506 dated Sep. 27, 2007.
United States Patent Office Action for U.S. Appl. No. 11/074,597 dated Mar. 20, 2008.
United States Patent Office Action for U.S. Appl. No. 11/074,597 dated Aug. 23, 2007.
United States Patent Office Action for U.S. Appl. No. 11/074,597 dated Jan. 31, 2007.
Spalvins, T., "A review of recent advances in solid film lubrication," J. Vac. Sci. Technol. A (1987) 5(2):212-219.
United States Patent Office Action for U.S. Appl. No. 12/007,555 dated Jan. 12, 2010.
United States Patent Office Action for U.S. Appl. No. 12/007,555 dated Jun. 10, 2010.
Berdinsky, A.S. et al., "Synthesis of MoS2 nanostruciures from nano-sieze powder by thermal annealing," Electron Devices and Materials (2000), EDM (2000) Siberian Russian Student Workshops on Sep. 19-21, 2000, Piscataway, NJ, USA.
Cizaire, L. et al., "Mechanisms of ultra-low friction by hollow inorganic fullerene-like MoS2 manoparicics," Surface and Coatings Technology (2002) 160(2-3);282-287.
Huang, H.D. et al., "Friction and wear properties of IF—MoS2 as additive in Paraffin oil," Tribology Letters (2005) 20:247-250.
Rapoport, L. et al., "Fullerene-like WS2 nanoparticles: superior lubricants for harsh conditions," Advanced Materials (2003) 15:651-655.
Xianguo Hu, "Emerald Article: On the size effect of molybdenum disulfide particles on tribological performance," Industrial Lubrication and Tribology (2005) 57:255-259.
United States Patent Office Action for U.S. Appl. No. 12/007,555 dated Oct. 4, 2012.
Supplemental European Extended Search Report and Search Opinion for European Patent Application No. 07710113.7 dated Sep. 20, 2012, 10 pages.
English translation of Japanese Office Action for Application No. 2008-550538 dated Sep. 20, 2012, 8 pages.
Ozkan et al., "Femtosecond laser-induced periodic structure writing on diamond crystals and microclusters", Applied Physics Letters, vol. 75, No. 23, Dec. 6, 1999, pp. 3716-3718.
Canter, Dr. Neil, "EP nanoparticles-based lubricant package", Tribology & Lubrication Technology, Apr. 2009, pp. 12-17.
Demydov, Ph.D., Dmytro, "Progress Report (2nd Quarter) Advanced Lubrication for Energy Efficiency, Durability and Lower Maintenance Costs of Advanced Naval Components and Systems", NanoMech, LLC, prepared for Office of Naval Research for the period of Feb. 20, 2010-May 19, 2010, 34 pages.
Verma et al., "Tribological Behavior of Deagglomerated Active Inorganic Nanoparticles for Advanced Lubrication", Tribology Transactions, Sep. 1, 2008, 51: pp. 673-678.
Adhvaryu, Dr. Antanu, "Multi-component Nanoparticle Based Lubricant Additive to Improve Efficiency and Durability in Engines", Caterpillar Inc., Aug. 7, 2008, 27 pgs.
U.S. Appl. No. 13/540,235, filed Jul. 2, 2012.
U.S. Appl. No. 13/540,256, filed Jul. 2, 2012.
International Search Report and Written Opinion of the International Searching Authority, dated Oct. 16, 2015, for PCT/US2015/027925.
Extended European Search Report dated Dec. 18, 2017 in EP Application No. 15805890.9.

* cited by examiner

NANO-TRIBOLOGY COMPOSITIONS AND RELATED METHODS INCLUDING HARD PARTICLES

CROSS-REFERENCE TO RELATED APPLICATIONS

This patent application is a continuation-in-part application and claims the benefit of the filing date under 35 U.S.C. § 120 of U.S. patent application Ser. No. 13/921,640, filed on Jun. 19, 2013. U.S. patent application Ser. No. 13/921,640 is a continuation application and claims the benefit of the filing date under 35 U.S.C. § 120 of U.S. patent application Ser. No. 12/160,758, filed on Jul. 11, 2008. U.S. patent application Ser. No. 12/160,758 is a national stage filing under 35 U.S.C. § 371 and claims priority to International Application No. PCT/US2007/060506, filed on Jan. 12, 2007. International Application No. PCT/US2007/060506 claims priority under 35 U.S.C. § 119(e) to U.S. Provisional Patent Application No. 60/758,307, filed on Jan. 12, 2006. U.S. patent application Ser. Nos. 13/921,640; 12/160,758; and 60/758,307; and International Application No. PCT/US2007/060506 are incorporated by reference into this specification.

TECHNICAL FIELD

This specification relates to compositions and methods in the field of tribology, solid surface engineering, lubrication, wear, and related functions such as corrosion resistance, catalysis, and the like. This specification also relates to compositions and methods in the sub-field of nano-tribology and associated solid surface nano-engineering, nano-lubrication, and nano-wear.

BACKGROUND

Tribology refers to the science and engineering of solid surfaces. Tribology includes the study and application of surface chemistry and structure, friction, lubrication, corrosion, and wear. The tribological interactions of a solid surface with interfacing materials and the surrounding environment may result in the loss of material from the surface in processes generally referred to as "wear." Major types of wear include abrasion, friction (adhesion and cohesion), erosion, and corrosion. Wear may be reduced by the use of lubricants and/or other anti-wear agents. Wear may also be reduced by modifying the surface properties of solids using one or more "surface engineering" processes (i.e., modifying the chemical and/or structural properties of solid surfaces).

SUMMARY

In a non-limiting embodiment, a composition comprises a plurality of hard particles and a plurality of lubricant nanoparticles. The lubricant nanoparticles have an average primary particle size of less than or equal to about 500 nm and an open architecture. An organic medium is intercalated in the lubricant nanoparticles.

In another non-limiting embodiment, a composition comprises a plurality of hard particles and a plurality of molybdenum disulfide nanoparticles. The molybdenum disulfide nanoparticles have an average primary particle size of less than or equal to about 100 nm and an open architecture. An oil medium is intercalated in and encapsulates the molybdenum disulfide nanoparticles.

It is understood that the invention disclosed and described in this specification is not limited to the embodiments summarized in this Summary.

BRIEF DESCRIPTION OF THE DRAWINGS

Various features and characteristics of the non-limiting and non-exhaustive embodiments disclosed and described in this specification may be better understood by reference to the accompanying figures, in which:

FIG. 3(A) shows molybdenum disulfide as it is available, typically from about a few microns to submicron size; FIG. 3(B) shows molybdenum disulfide that has been ball milled in air for 48 hours; FIG. 3(C) is a high resolution electron microscopy image that shows molybdenum disulfide that has been ball milled in air for 48 hours; FIG. 3(D) is a high-resolution transmission electron microscopy (HRTEM) image that shows molybdenum disulfide that has been ball milled in air for 48 hours followed by ball milling in oil for 48 hours;

FIG. 4(A) is the XRD spectra for molybdenum disulfide that has been ball milled in air for 48 hours followed by ball milling in oil for 48 hours; FIG. 4(B) is the XRD spectra for molybdenum disulfide that has been ball milled in air for 48 hours; FIG. 4(C) is the XRD spectra for molybdenum disulfide that has not been ball milled;

FIG. 6(A) shows the average wear scar diameter for a base oil (paraffin oil), paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours; FIG. 6(B) shows the load wear index for paraffin oil without a nanoparticle additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours; FIG. 6(C) shows the coefficient of friction for paraffin oil without a nanoparticle additive, paraffin oil with micron sized $MoS_2$ (c-$MoS_2$), paraffin oil with $MoS_2$ that was milled in air for 48 hours (d-$MoS_2$), and paraffin oil with $MoS_2$ that was milled in air for 48 hours followed by milling in canola oil for 48 hours (n-$MoS_2$); FIG. 6(D) shows the extreme pressure data for paraffin oil with micron sized $MoS_2$ (c-$MoS_2$), paraffin oil with $MoS_2$ that was milled in air for 48 hours (d-$MoS_2$), and paraffin oil with $MoS_2$ that was milled in air for 48 hours followed by milling in canola oil for 48 hours (n-$MoS_2$); in each test the lubricant nanoparticle additive was present in the amount of 1% by weight;

FIG. 7(A) shows the close caged dense oval shaped architecture of molybdenum disulfide nanoparticles that have been ball milled in air for 48 hours; FIG. 7(B) shows the open ended oval shaped architecture of molybdenum disulfide nanoparticles that have been ball milled in air for 48 hours followed by ball milling in canola oil for 48 hours;

FIG. 9(A) shows paraffin oil without any nanoparticle composition additive; FIG. 9(B) shows paraffin oil with molybdenum disulfide nanoparticles that have been ball milled in air for 48 hours followed by ball milling in oil for 48 hours and treated with a phospholipid emulsifier;

Figure 1:
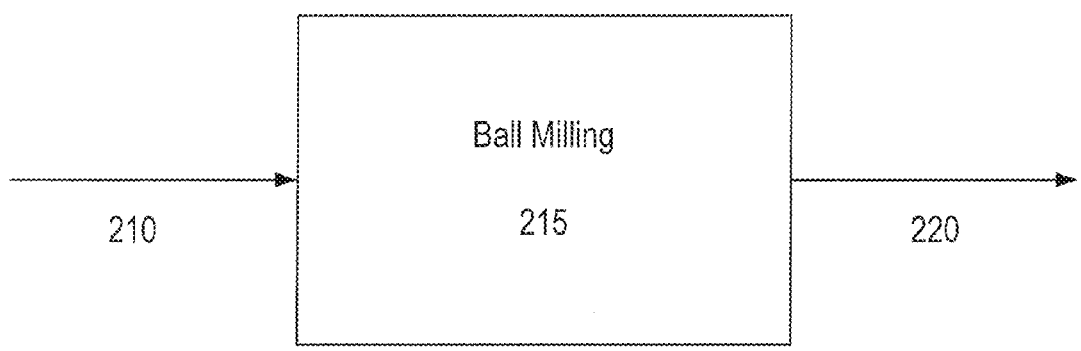
FIG. 1 is a diagram illustrating a method of producing lubricant nanoparticles.

The reader will appreciate the foregoing details, as well as others, upon considering the following detailed description of various non-limiting and non-exhaustive embodiments according to this specification.

DESCRIPTION

Various embodiments are described and illustrated in this specification to provide an overall understanding of the composition, function, operation, and application of the disclosed compositions and methods. It is understood that the various embodiments described and illustrated in this specification are non-limiting and non-exhaustive. Thus, the invention is not necessarily limited by the description of the various non-limiting and non-exhaustive embodiments disclosed in this specification. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. §§ 112(a) and 132(a). The various embodiments disclosed and described in this specification can comprise, consist of, or consist essentially of the features and characteristics as variously described in this specification.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited in this specification. All such ranges are intended to be inherently described in this specification such that amending to expressly recite any such sub-ranges would comply with the requirements of 35 U.S.C. §§ 112(a) and 132(a).

Any patent, publication, or other disclosure material identified in this specification is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference into this specification. Any material, or portion thereof, that is said to be incorporated by reference into this specification, but which conflicts with existing definitions, statements, or other disclosure material set forth in this specification, is only incorporated to the extent that no conflict arises between that incorporated material and the existing disclosure material. Applicants reserve the right to amend this specification to expressly recite any subject matter, or portion thereof, incorporated by reference into this specification.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

In the field of tribology, corrosion generally refers to the undesired chemical reaction of material surfaces with components in the surrounding environment. In this regard, corrosion is a type of chemical degradation and the term is usually used in connection with the electrochemical oxidation of metal and alloy surfaces. For instance, the rusting of iron and steel alloys (i.e., the electrochemical oxidation of elemental iron atoms to iron oxide compounds) is a well-known type of corrosion. Corrosion is a diffusion-controlled process; therefore, corrosion occurs on material surfaces exposed to an oxidative external environment. Corrosion can develop more or less uniformly over exposed material surfaces.

Pitting corrosion is a form of localized corrosion that results in the formation of small holes or "pits" in the metal or alloy forming the surface of an article. Pitting corrosion is typically encountered in passivating metals and alloys, i.e., alloys such as stainless steels, aluminum and aluminum-base alloys, titanium and titanium-base alloys, and nickel-base alloys, for example, that oxidize in air to form a stable, adherent, and inert metal oxide layer that provides a surface barrier to corrosive attack of the underlying metallic atoms. Pitting corrosion may also be encountered in other metal and alloy materials such as non-stainless steels that have been passivated by special treatments such as chromate conversion, phosphate conversion, and galvanization. Metals and alloys such as untreated carbon steels, for example, which are susceptible to uniform corrosion because of a lack of a passivating surface layer, do not generally develop pitting corrosion. Thus, a carbon steel article may corrode uniformly in sea water, while a stainless steel article may develop localized pitting corrosion in the same environment.

The chemical driving force for pitting corrosion is the depassivation of a small localized area of a metal or alloy article surface where the passivating layer is breached or otherwise compromised. The depassivated area becomes anodic (i.e., electrochemically oxidative) while an adjacent area becomes cathodic (i.e., electrochemically reductive), leading to localized galvanic corrosion at the depassivated area. The localized galvanic corrosion penetrates through the passivating layer and into the sub-surface region of the metal or alloy article, thereby forming the small holes or "pits" characteristic of pitting corrosion. Pitting corrosion may be particularly problematic because the localization of the pitting results in a relatively small wear effect on material surfaces, but produces significant material wear deep into the sub-surface regions of the material.

Pitting corrosion may be initiated by a small surface defect such as damage to a passivating surface layer (e.g., a surface scratch), a local change in surface material composition, or other non-uniformities in a material surface such as high levels of surface roughness. Accordingly, polished metal and alloy surfaces may exhibit higher resistance to pitting corrosion.

Additionally, pitting corrosion is a concern in many mechanical systems comprising mechanically engaging components (e.g., gears) that are made of metals or alloys such as stainless steels, aluminum, or titanium, for example. This is because the mechanical contact between the engaging components may cause localized frictional wearing, abrasion, and/or erosion of the metallic surfaces, thereby forming localized surface non-uniformities and/or damaging passivating surface layers, thereby providing localized areas for the development of pitting corrosion. Lubrication processes and compositions are intended to reduce frictional wearing of the surfaces of mechanically engaging components. However, conventional lubrication processes and compositions do not address the removal of surface non-uniformities and nascent pitting corrosion.

Various non-limiting embodiments described in this specification are directed to compositions and methods that simultaneously provide synergistic lubrication and polishing of mechanically-engaging components, such as, for example, gears and other mechanical components commonly fabricated from metals and alloys. The compositions may comprise hard particles and lubricant nanoparticles. The hard particles comprise micron-scale or nano-scale particles that provide micro-polishing or nano-polishing action to the surfaces of mechanically-engaging components, thereby removing surface non-uniformities and nascent pitting corrosion that may form on the components. The lubricant nanoparticles provide enhanced lubrication to the surfaces of mechanically-engaging components, thereby reducing the coefficient of friction and attendant wear. The combination of hard particles and lubricant nanoparticles provides the synergistic combination of simultaneous surface polishing and surface lubrication that reduces, minimizes, or eliminates pitting corrosion in mechanical systems, in situ, under operating conditions.

In various embodiments, a composition may comprise a plurality of hard particles and a plurality of lubricant nanoparticles. The hard particles may have an average primary particle size of 10 micrometers or less. The lubricant nanoparticles may have an average primary particle size of less than or equal to 1000 nanometers, and in some embodiments, less than or equal to 500 nanometers, less than or equal to 400 nanometers, less than or equal to 300 nanometers, less than or equal to 200 nanometers, less than or equal to 100 nanometers, less than or equal to 75 nanometers, less than or equal to 50 nanometers, or less than or equal to 25 nanometers.

As used in this specification, including the claims, the term "average primary particle size" refers to a particle size as determined by visually examining a microscopy image of a sample of particles, measuring the largest length dimension of the individual particles in the image (i.e., the diameters of the smallest spheres that completely surround the individual particles in the image), and calculating the average of the length dimensions (diameters) based on the magnification of the image. A person having ordinary skill in the art will understand how to prepare a microscopy image (e.g., light microscopy, transmission electron microscopy, and the like) of the particles comprising a composition and determine the average primary particle size of constituent particles (or a subset of the constituent particles based on like particle composition) based on the magnification of the microscopy image. As used in this specification, the term "average primary particle size" refers the size of individual particles as opposed to agglomerations of two or more individual particles.

In various embodiments, the hard particles may comprise at least one of ceramic particles such as hard carbon particles, boride particles, carbide particles, nitride particles, oxide particles, silicide particles, carbo-nitride particles, oxy-nitride particles, and combinations of any thereof. For example, the hard particles may comprise one or more of a metal boride, a metal carbide, a metal nitride, a metal oxide, or a metal silicide. The hard particles may also comprise a solid state solution of any two or more metal borides, metal carbides, metal nitrides, metal oxides, or metal silicides. For example, the hard particles may comprise a mixed metal oxide (e.g., an aluminum-zirconium oxide), a mixed metal nitride (e.g., an aluminum-titanium nitride or aluminum chromium nitride), a mixed metal carbide (e.g., titanium-zirconium carbide), a mixed metal boride, or a mixed metal silicide. The hard particles may also comprise particulate mixtures of any two or more metal borides, metal carbides, metal nitrides, metal oxides, or metal silicides (e.g., a combination of silicon carbide particles and aluminum oxide particles, or a combination of cubic boron nitride particles and cubic zirconia particles).

The hard particles may comprise at least one of a metal boride, a metal carbide, a metal nitride, a metal oxide, a metal silicide, a solid state solution of any thereof, or a particulate mixture of any thereof, wherein the metal comprises at least one element selected from groups IIIA, IVB, VB, and VIB of the periodic table (i.e., the boron group, titanium group, vanadium group, and chromium group, respectively). For example, the hard particles may comprise at least one of a metal boride, a metal carbide, a metal nitride, a metal oxide, a metal silicide, a solid state solution of any thereof, or a particulate mixture of any thereof, wherein the metal comprises at least one element selected from the group consisting of boron, aluminum, titanium, zirconium, hafnium, vanadium, niobium, tantalum, chromium, molybdenum, and tungsten.

In various embodiments, the hard particles may comprise hard carbon. In such embodiments, the hard particles may comprise at least one of synthetic diamond, natural diamond, amorphous carbon, or nanocrystalline carbon. The hard particles may comprise single crystal diamond particles or polycrystalline diamond particles (i.e., particles comprise more than one crystal grain per particle), including single- or poly-crystalline synthetic or natural diamond particles. The hard particles may comprise diamond particles alone or in combination with other types of hard particles such as at least one of a metal boride, a metal carbide, a metal nitride, a metal oxide, or a metal silicide.

The hard particles may comprise at least one metal carbide such as, for example, a tungsten carbide, molybdenum carbide, chromium carbide, tantalum carbide, niobium carbide, vanadium carbide, hafnium carbide, zirconium carbide, titanium carbide, boron carbide, silicon carbide, solid state solutions of any thereof, and particulate mixtures of any thereof. While silicon and boron are often considered metalloids and not metallic elements per se, in this specification, it is understood that silicon and boron are considered metals for purposes of metal carbides, metal nitrides, and metal oxides. Silicon is also considered a metal in connection with metal borides.

The hard particles may comprise at least one metal nitride such as, for example, cubic boron nitride, a silicon nitride, a titanium nitride, a zirconium nitride, a hafnium nitride, a tungsten nitride, solid state solutions of any thereof, and particulate mixtures of any thereof.

The hard particles may comprise at least one metal oxide such as, for example, an aluminum oxide (e.g., $\alpha$-$Al_2O_3$, i.e., corundum), a cerium oxide, a titanium oxide, a zirconium oxide, solid state solutions of any thereof, and particulate mixtures of any thereof.

The hard particles may comprise at least one metal boride such as, for example, titanium diboride, zirconium diboride, hafnium diboride, a tantalum boride, a tungsten boride (e.g., tungsten tetraboride), a silicon boride, solid state solutions of any thereof, and particulate mixtures of any thereof.

In various embodiments, the hard particles may comprise particle mixtures of any of the metal boride, a metal carbide, a metal nitride, a metal oxide, or a metal silicides described above. The hard particles may also comprise at least one mixed non-metal such as a metal carbonitride. For example, the hard particles may comprise at least one metal carbonitride such as, for example, a boron carbonitride, a silicon carbonitride, a titanium carbonitride, a zirconium carbonitride, a hafnium carbonitride, a tungsten carbonitride, solid state solutions of any thereof, and particulate mixtures of any thereof.

In various embodiments, the hard particles may comprise a metal boride, a metal carbide, a metal nitride, a metal oxide, a metal silicide, solid state solutions of any thereof, mixed metal versions of any thereof, mixed non-metal versions of any thereof, or particulate mixtures of any thereof, wherein the constituent compounds are stoichiometric or non-stoichiometric.

In various embodiments, the hard particles may be functionalized. The hard particles may be functionalized with organic molecules or functional groups, inorganic molecules or functional groups, or both organic and inorganic molecules or functional groups, forming functionalized hard particles. The hard particles may be functionalized with catalysts, antioxidants, anti-corrosion agents, biocidal agents, or combinations of any thereof. Examples of antioxidants, anticorrosion agents, and biocidal agents include, but are not limited to, antioxidants selected from the group consisting of hindered phenols, alkylated phenols, alkyl amines, aryl amines, 2,6-di-tert-butyl-4-methylphenol, 4,4'-di-tert-octyldiphenylamine, tert-butyl hydroquinone, tris(2,4-di-tert-butylphenyl)phosphate, phosphites, thioesters, or combinations of any thereof; anticorrosion agents selected from the group consisting of alkaline earth metal bisalkyl-phenolsulphonates, dithiophosphates, alkenylsuccinic acid half-amides, or combinations thereof; and biocidal agents material selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, or combinations of any thereof.

In various embodiments, the hard particles may be functionalized with a dispersant agent. Suitable dispersant agents may comprise at least one material selected from the group consisting of amide compounds, borate compounds, and boride compounds. For example, a dispersant agent may comprise at least one of succinimide and disodium octaborate tetrahydrate.

As described above, in various embodiments, a composition may comprise a plurality of hard particles and a plurality of lubricant nanoparticles. The lubricant nanoparticles may have an open architecture.

As used in this specification, the term "open architecture" or "open-ended architecture" refers to the morphology of particles comprising fissures, separations, or other discontinuities in the particles' outer surfaces which provide openings to the internal portions of the individual particles. In embodiments comprising layered particles, the terms "open architecture" or "open-ended architecture" refer to the morphology of the layered particles comprising inter-layer defects (e.g., shearing, buckling, folding, curling, and dislocating of constituent atomic and/or molecular layers) at the surface of the particles, which increase the inter-planar spacing between groupings of molecular layers, thereby providing fissures, separations, or other discontinuities in the particles' outer surfaces and openings to the internal portions of the particles. As used in this specification, the term "layered particles" or "layered nanoparticles" refers to particles comprising generally parallel stacked molecular layers, wherein the inter-layer bonding comprises relatively weak bonding such van der Waals bonding, and wherein the intra-layer bonding comprises relatively strong bonding such as covalent bonding. Examples of layered particles include, but are not limited to, graphite particles, molybdenum disulfide particles, tungsten disulfide particles, niobium diselenide particles, hexagonal boron nitride particles, and carbon particles. It is understood that the terms "open architecture" and "open-ended architecture" exclude particle morphologies such as closed nano-tubes and fullerenes, which are characterized by closed particle surfaces lacking fissures, separations, or other discontinuities in the particles' outer surfaces.

The term "closed architecture," as used in this specification, refers to the morphology of particles lacking fissures, separations, or other discontinuities in the particles' outer surfaces and, therefore, lacking openings to the internal portions of the individual particles. In various embodiments, the hard particles may comprise a closed architecture or an open architecture.

The compositions described in this specification may also comprise an organic medium intercalated in the lubricant nanoparticles. For example, an organic medium may be integrated into the internal portions of individual lubricant nanoparticles by intercalating into the spaces formed by the fissures, separations, or other discontinuities in the outer surfaces of lubricant nanoparticles having an open architecture. In various embodiments, the lubricant nanoparticles may be intercalated and encapsulated with an organic medium.

The lubricant nanoparticles may comprise a lubricant material such as, for example, molybdenum disulfide, tungsten disulfide, hexagonal boron nitride, or graphite. Thus, the compositions described in this specification may comprise molybdenum disulfide nanoparticles, tungsten disulfide nanoparticles, hexagonal boron nitride nanoparticles, graphite nanoparticles, or combinations of any thereof, as lubricant nanoparticles, which may optionally be encapsulated and/or intercalated with an organic medium.

The organic medium may comprise at least one material selected from the group consisting of oil mediums, grease mediums, alcohol mediums, composite oils, canola oil, vegetable oil, soybean oil, corn oil, rapeseed oil, ethyl and methyl esters of rapeseed oil, monoglycerides, distilled monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, lecithins, and combinations of any thereof. In various embodiments, the organic medium may comprise an oil medium such as, for example, a composite oil, canola oil, a vegetable oil, soybean oil, corn oil, a hydrocarbon oil, a mineral oil, or combinations of any thereof.

The compositions and methods described in this specification may comprise, among other components, lubricant nanoparticles which may comprise nano-sheets. Nano-sheets are further described, for example, in U.S. patent application Ser. No. 14/173,369, filed Feb. 5, 2014, which is incorporated by reference into this specification. As used in this specification, including the claims, the term "nano-sheets" refers to planar-shaped particles having a thickness dimension of less than 500 nanometers and an aspect ratio (defined as the ratio of the largest length/width dimension to the thickness dimension) of at least 2. In some embodiments, for example, nano-sheets may have a thickness dimension of less than 100 nanometers and an aspect ratio of at least 10. Nano-sheets may have a thickness dimension of less than 50 nanometers and an aspect ratio of at least 20. Nano-sheets may have a thickness dimension of less than 25 nanometers and an aspect ratio of at least 40. Nano-sheets may have a thickness dimension of less than 10 nanometers and an aspect ratio of at least 100. Nano-sheets may have a thickness dimension corresponding to approximately one unit cell dimension and such nano-sheets may be referred to as molecular nano-sheets. Nano-sheets may have length and width dimensions of less than 1000 nanometers.

Molecular nano-sheets are a sub-genus of nano-sheets in which the thickness dimensions of the nano-sheets correspond to approximately one unit cell dimension. Molecular nano-sheets may be, but are not necessarily, crystalline molecular structures. In some embodiments, molecular nano-sheets may have length and width dimensions of less than or equal to 1000 nanometers, 500 nanometers, or 100 nanometers. In some embodiments, molecular nano-sheets may have a thickness dimension corresponding to approximately one unit cell dimension. Generally, a molecular nano-sheet may comprise a single layer of any layered nanoparticle (e.g., a graphite/graphene molecular nano-sheet, a molybdenum disulfide molecular nano-sheet, a tungsten disulfide molecular nano-sheet, a niobium diselenide molecular nano-sheet, or a hexagonal boron nitride molecular nano-sheet).

The crystal structure of a material (i.e., the spatial arrangement of the atoms forming a crystal) can be described in terms of the unit cell. A unit cell is the smallest molecular unit that a crystal can be divided into using crystallographic symmetry operations. In other words, a unit cell is the simplest repeating unit in a crystalline material. Unit cells stacked in three-dimensional space describe the bulk arrangement of atoms of a crystalline material.

By way of example, molybdenum disulfide predominantly exists in a hexagonal crystal form characterized by $MoS_2$ layers in which the molybdenum atoms have trigonal prismatic coordination of six sulfur atoms with two molecules per unit cell. Thus, the molybdenum disulfide crystal structure comprises a tri-layer having one planar hexagonal layer of molybdenum atoms interspersed between two planar layers of sulfur atoms forming an intra-molecular covalently bonded S—Mo—S molecular layer. Bulk molybdenum disulfide comprises relatively weak inter-molecular van der Waals bonds between the adjacent sulfur atoms of stacked S—Mo—S molecular layers.

Figure 10A:
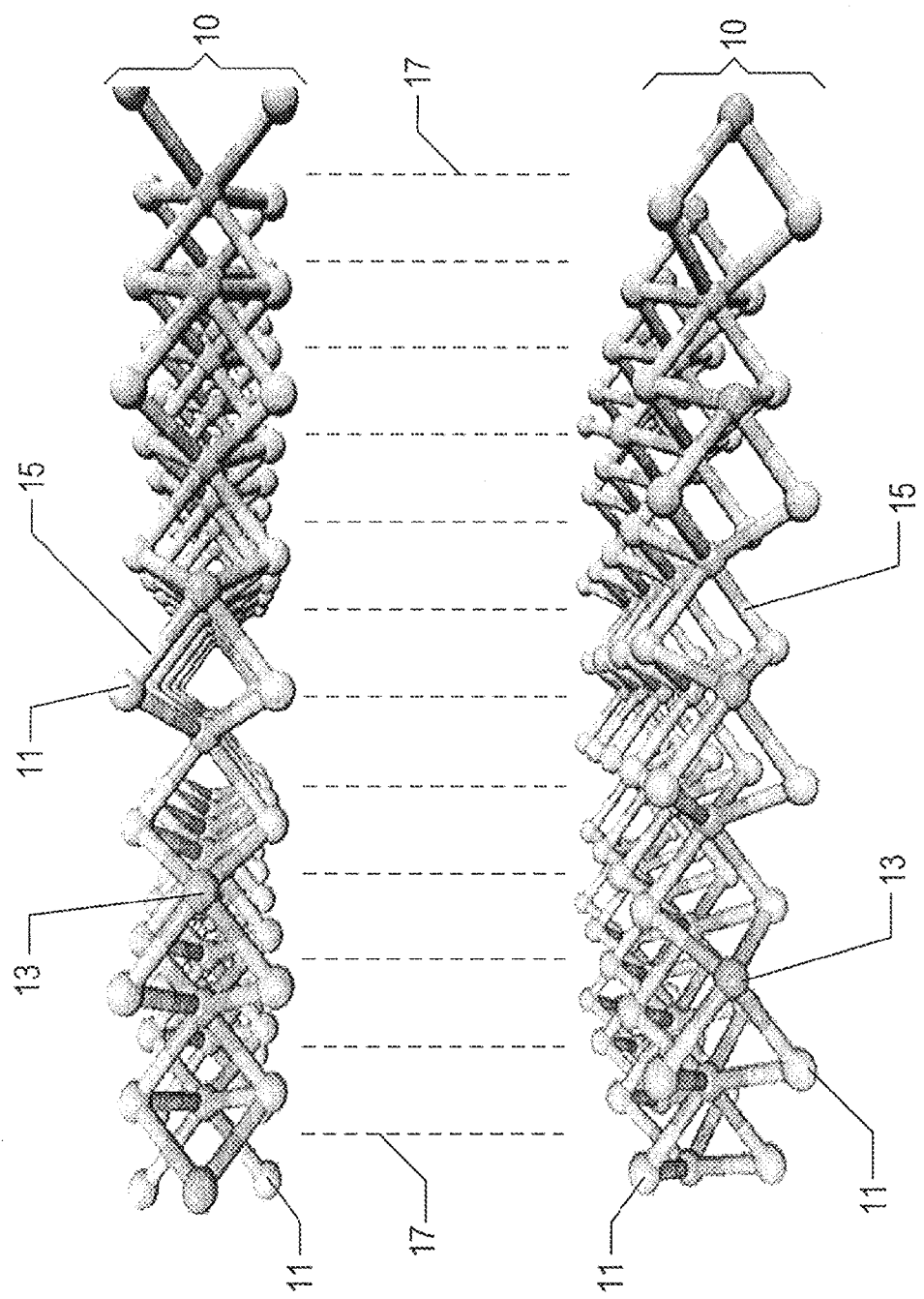
FIGS. 10(A) and 10(B) show schematic diagrams of the crystal structure of molybdenum disulfide.
Figure 10B:
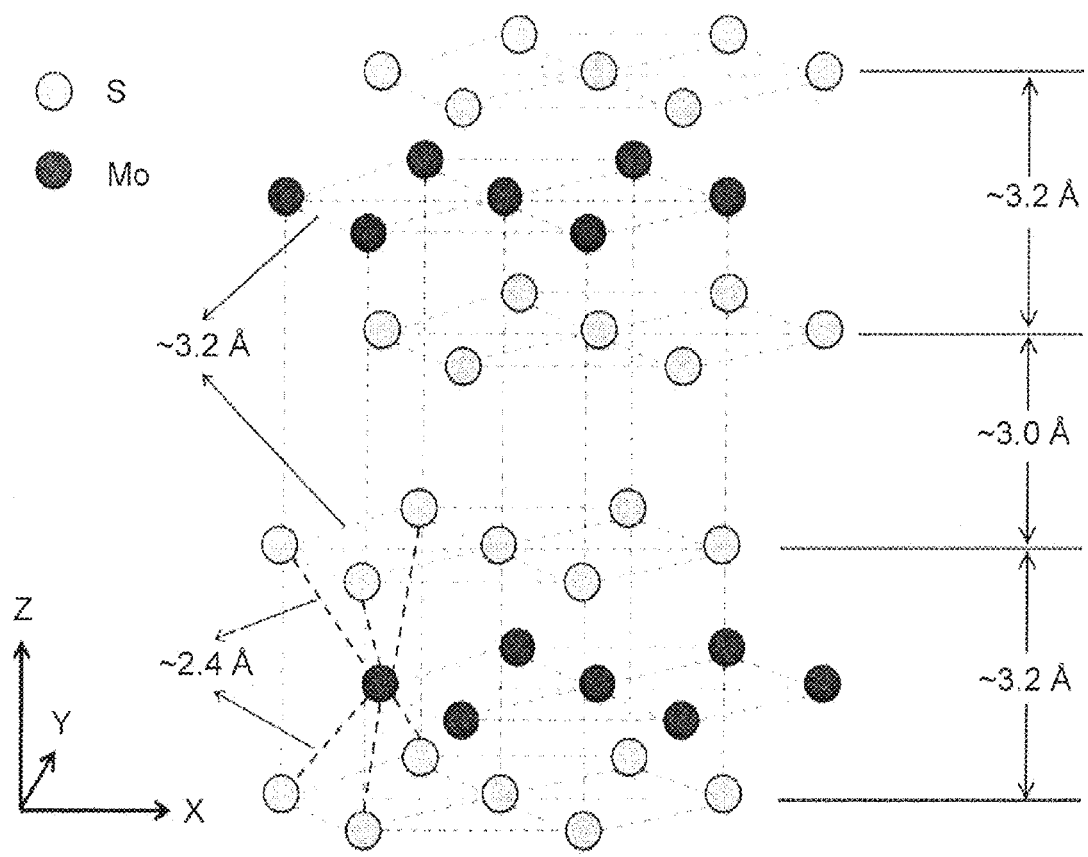

Referring to FIG. 10(A), two intra-molecular covalently bonded S—Mo—S molecular layers 10 are shown with inter-molecular van der Waals bonds 17 between the adjacent sulfur atoms 11 of the two stacked S—Mo—S molecular layers 10. Within each S—Mo—S molecular layer 10, the molybdenum atoms 13 and the sulfur atoms 11 form the tri-layer comprising one planar hexagonal layer of molybdenum atoms 13 interspersed between two planar layers of sulfur atoms 11 and forming covalent bonds 15. Referring to FIG. 10(B), the molybdenum disulfide unit cell has a thickness dimension of approximately 3.241 angstroms across the S—Mo—S molecular layer.

Accordingly, a molybdenum disulfide molecular nano-sheet may comprise a molybdenum disulfide crystal having a thickness dimension corresponding to the thickness of the covalently bonded S—Mo—S molecular layer (without adjoining inter-molecular van der Waals bonded layers, i.e., approximately 3.241 angstroms) and, in some embodiments, length and width dimensions of less than or equal to 1000 nanometers.

The crystal structure of tungsten disulfide is analogous to that of molybdenum disulfide and, therefore, a tungsten disulfide molecular nano-sheet may comprise a tungsten disulfide crystal having a thickness dimension corresponding to the thickness of the covalently bonded S—W—S molecular layer (without adjoining inter-molecular van der Waals bonded layers) and, in some embodiments, length and width dimensions of less than or equal to 1000 nanometers.

Figure 11:
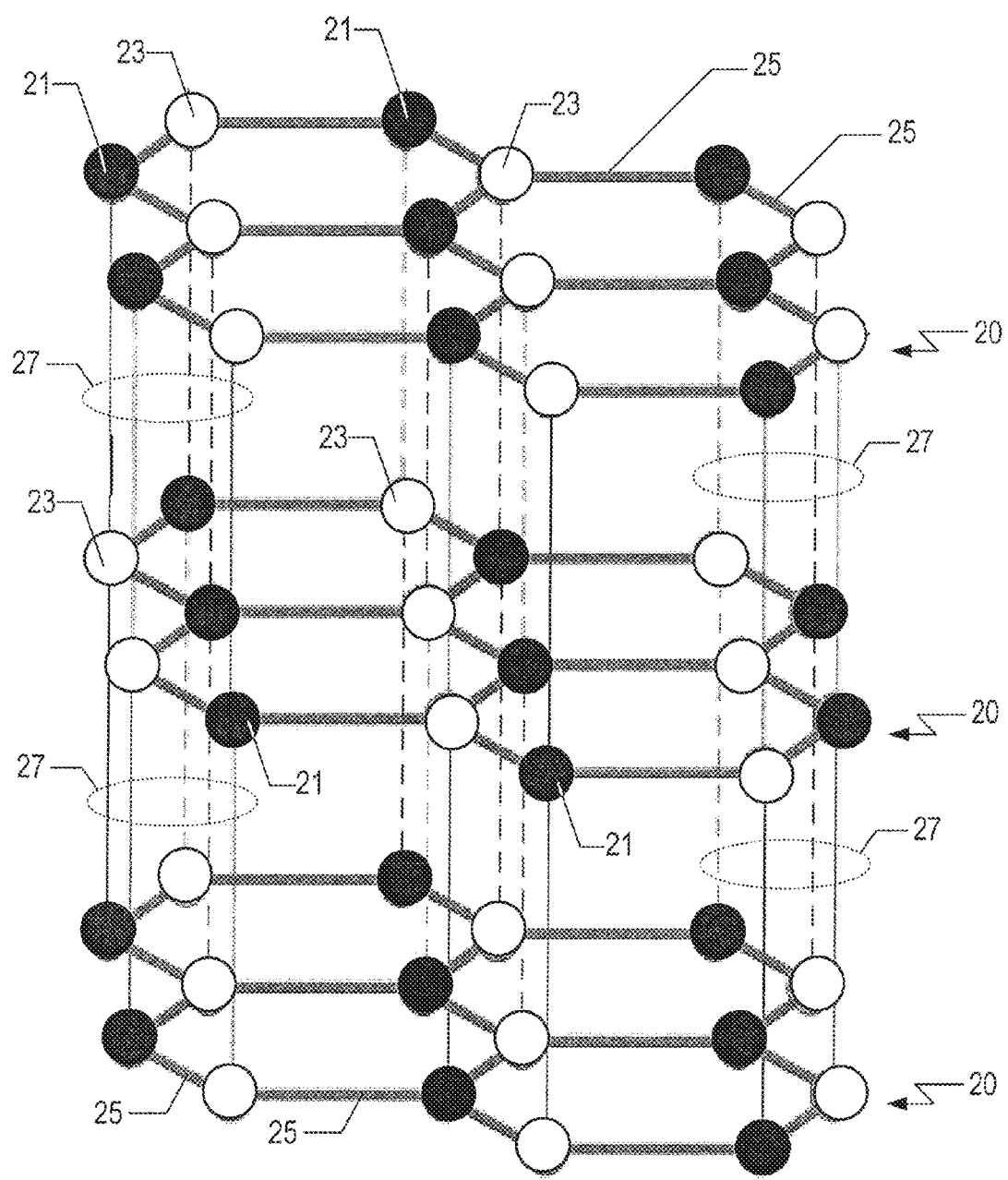
FIG. 11 shows a schematic diagram of the crystal structure of hexagonal boron nitride.

The crystal structure of hexagonal boron nitride is characterized by hexagonal coordination between three nitrogen atoms and three boron atoms forming adjacent six-sided rings that form intra-molecular covalently-bonded monolayers that are atomically thin (i.e., having a thickness dimension of a single atom). Referring to FIG. 11, three intra-molecular covalently bonded B—N molecular layers 20 are shown with inter-molecular van der Waals bonds 27 between the adjacent B—N molecular layers 20. Within each B—N molecular layer 20, the boron atoms 23 and the nitrogen atoms 21 form the mono-layer comprising the hexagonal atomic orientation within a single plane and forming the covalent bonds 25. Thus, the hexagonal boron nitride crystal structure comprises B—N molecular monolayers, and bulk hexagonal boron nitride comprises relatively weak inter-molecular van der Waals bonds between the adjacent B—N molecular mono-layers. Therefore, a hexagonal boron nitride molecular nano-sheet may comprise a hexagonal boron nitride crystal having a single atomic thickness dimension and, in some embodiments, length and width dimensions of less than or equal to 1000 nanometers.

The crystal structure of graphite (carbon) is analogous to that of hexagonal boron nitride and, therefore, a graphite molecular nano-sheet may comprise a graphene crystal having a single atomic thickness dimension and, in some embodiments, length and width dimensions of less than or equal to 1000 nanometers.

In various embodiments, nano-sheets may comprise a material such as, for example, molybdenum disulfide, tungsten disulfide, niobium diselenide, hexagonal boron nitride, graphite/graphene, metals such as copper or silver, inorganic compounds such as calcium carbonate, polymers such as PTFE, or dithiophosphate compounds. In some embodiments, the nano-sheets may comprise molecular nano-sheets comprising a material such as, for example, molybdenum disulfide, tungsten disulfide, niobium diselenide, hexagonal boron nitride, or graphene. Thus, the compositions described in this specification may comprise molybdenum disulfide nano-sheets, tungsten disulfide nano-sheets, niobium diselenide nano-sheets, hexagonal boron nitride nano-sheets, graphite nano-sheets, graphene molecular nano-sheets, metal (e.g., copper) nano-sheets, inorganic compound (e.g., calcium carbonate) nano-sheets, polymer (e.g., PTFE) nano-sheets, nano-sheets comprising dithiophosphate compounds, or combinations of any thereof.

It is important to recognize that layered materials such as, for example, molybdenum disulfide, tungsten disulfide, niobium diselenide, hexagonal boron nitride, and graphite, may form nano-sheets (e.g., planar-shaped particles having a thickness dimension of less than 500 nanometers and an aspect ratio of at least 2) or molecular nano-sheets (e.g., crystalline molecular structures comprising a thickness dimension corresponding to approximately one unit cell dimension). In this regard, molecular nano-sheets are a sub-genus of nano-sheets.

In various embodiments, the nano-sheets and/or nanoparticles may be functionalized. The nano-sheets and/or nanoparticles may be functionalized with organic molecules or functional groups, inorganic molecules or functional groups, or both organic and inorganic molecules or functional groups, forming functionalized nano-sheets and/or nanoparticles. The nano-sheets and/or nanoparticles may be functionalized with catalysts, antioxidants, anti-corrosion agents, biocidal agents, or combinations of any thereof. Examples of antioxidants, anticorrosion agents, and biocidal agents include, but are not limited to, antioxidants selected from the group consisting of hindered phenols, alkylated phenols, alkyl amines, aryl amines, 2,6-di-tert-butyl-4-methylphenol, 4,4'-di-tert-octyldiphenylamine, tert-butyl hydroquinone, tris(2,4-di-tert-butylphenyl)phosphate, phosphites, thioesters, or combinations of any thereof; anticorrosion agents selected from the group consisting of alkaline earth metal bisalkylphenolsulphonates, dithiophosphates, alkenylsuccinic acid half-amides, or combinations thereof; and biocidal agents material selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, or combinations of any thereof.

In various embodiments, the nano-sheets and/or nanoparticles may be functionalized with a dispersant agent. Suitable dispersant agents may comprise at least one material selected from the group consisting of amide compounds, borate compounds, and boride compounds. For example, a dispersant agent may comprise at least one of succinimide and disodium octaborate tetrahydrate.

In various embodiments, the nano-sheets and/or nanoparticles may be coated and/or encapsulated with an organic medium. For instance, an organic medium may be chemically or physically adsorbed onto nano-sheets and/or nanoparticles or otherwise chemically or physically bonded to nano-sheets and/or nanoparticles. As described above, nanoparticles may be encapsulated and/or intercalated with an organic medium. As used herein, the term "organic medium" refers to hydrophobic/oleophilic substances and carbon-based compounds. For example, the organic medium may comprise at least one material selected from the group consisting of oil media, grease media, alcohol media, composite oils, mineral oils, synthetic oils, canola oil, vegetable oil, soybean oil, corn oil, rapeseed oil, ethyl and methyl esters of rapeseed oil, monoglycerides, distilled monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, lecithins, amide compounds, boron-containing compounds, dithiophosphate compounds, and combinations of any thereof. Examples of suitable dithiophosphate compounds that may comprise an organic medium include, but are not limited to, zinc dialkyl dithiophosphate (ZDDP) and molybdenum dithiophosphate (MoDTP), which may be used alone or in combination with any other organic medium such as an oil medium. In various embodiments, the organic medium may comprise an oil medium such as, for example, a composite oil, a mineral oil, a synthetic oil, canola oil, a vegetable oil, soybean oil, corn oil, a hydrocarbon oil, a mineral oil, or combinations of any thereof.

In addition to the lubricant nanoparticles, the compositions described in this specification may also comprise a secondary solid lubricant material such as, for example, polytetrafluoroethylene, soft metals, silver, lead, nickel, copper, cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, or combinations of any thereof. The secondary solid lubricant material may comprise nanoparticles. The secondary solid lubricant nanoparticles may have an average primary particle size of less than or equal to 1000 nanometers, and in some embodiments, less than or equal to 500 nanometers, less than or equal to 400 nanometers, less than or equal to 300 nanometers, less than or equal to 200 nanometers, less than or equal to 100 nanometers, less than or equal to 75 nanometers, less than or equal to 50 nanometers, or less than or equal to 25 nanometers.

In various embodiments, the compositions described in this specification may also comprise a base lubricant material. The hard particles and the lubricant nanoparticles may be dispersed in the base lubricant material. The base lubricant material may comprise a material such as, for example, an oil, a grease, a polymer, a plastic, a gel, a paste, a wax, a silicone, a hydrocarbon oil, a vegetable oil, corn oil, peanut oil, canola oil, soybean oil, a mineral oil, a paraffin oil, a synthetic oil, a petroleum gel, a petroleum grease, a hydrocarbon gel, a hydrocarbon grease, a lithium based grease, a fluorocarbon based grease, silicon based grease, ethylenebistearamide, or combinations of any thereof. In various embodiments, the base lubricant material may comprise at least one material selected from the group consisting of an oil, a grease, a plastic, a gel, a wax, a silicone, and combinations of any thereof. In various embodiments, the base lubricant material may comprise an oil or a grease. In various embodiments, the base lubricant material may comprise at least one material selected from the group consisting of a mineral oil, a paraffin oil, a synthetic oil, a petroleum grease, a hydrocarbon grease, a lithium based grease, or combinations of any thereof.

In various embodiments, the compositions described in this specification may also comprise an emulsifier. The emulsifier may comprise at least one material selected from the group consisting of lecithins, phospholipids, soy lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, or combinations of any thereof. In various embodiments, the emulsifier may comprise a compound containing phosphorous. In various embodiments, the emulsifier may comprise a phospholipid. In various embodiments, the emulsifier may comprise a lecithin.

In various embodiments, the compositions described in this specification may also comprise one or more of an antioxidant, an anticorrosion agent, or a biocidal. For example, the compositions may comprise at least one antioxidant material selected from the group consisting of hindered phenols, alkylated phenols, alkyl amines, aryl amines, 2,6-di-tert-butyl-4-methylphenol, 4,4'-di-tert-octyl-diphenylamine, tert-butyl hydroquinone, tris(2,4-di-tert-butylphenyl)phosphate, phosphites, thioesters, or combinations of any thereof. The compositions may comprise at least one anticorrosion agent selected from the group consisting of alkaline earth metal bisalkylphenolsulphonates, dithio-phosphates, alkenylsuccinic acid half-amides, or combinations thereof. The compositions may comprise at least one biocidal material selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, or combinations of any thereof.

The compositions described in this specification may be used to formulate a lubricant. For example, compositions comprising hard particles, lubricant nanoparticles, and an organic medium intercalated in the lubricant nanoparticles may be used as performance-enhancing additives to off-the-shelf liquid based lubricants. Additionally, lubricant compositions may comprise hard particles and lubricant nanoparticles dispersed in a lubricant base material as described above, wherein a separate organic medium is intercalated in the lubricant nanoparticles. Lubricant compositions comprising hard particles, lubricant nanoparticles, and an organic medium intercalated in the lubricant nanoparticles, in accordance with the embodiments described in this specification, will provide a synergistically enhanced combination of simultaneous surface polishing and surface lubrication that reduces, minimizes, or eliminates pitting corrosion in mechanical systems, in situ, under operating conditions.

For instance, a gear oil for automotive or other mechanical gearing applications, may be formulated to comprise hard particles, lubricant nanoparticles, and an organic medium intercalated in the lubricant nanoparticles, where the gear oil provides improved wear protection and reduced pitting, decreasing frictional energy losses and improving energy utilization efficiency (e.g., fuel efficiency in automotive and racing applications). In lubrication applications, compositions formulated to comprise hard particles, lubricant nanoparticles, and an organic medium intercalated in the lubricant nanoparticles may effectively operate under high load, high temperature, and high speed conditions, and may provide improved lubrication and pitting resistance under elastohydrodynamic, boundary, and mixed lubrication regimes. Such improvements may be realized by the addition of additives to off-the-shelf liquid phase lubricants, where the additives comprise hard particles, lubricant nanoparticles, and an organic medium intercalated in the lubricant nanoparticles.

In various embodiments, a composition may comprise, in weight percent based on total weight of the particles in the composition, from 1% to 99% hard particles, and from 1% to 99% lubricant nanoparticles, or any sub-ranges subsumed therein, such as, for example, 5% to 95% hard particles, and from 5% to 95% lubricant nanoparticles.

The compositions and methods comprising lubricant nanoparticles and an organic medium may be made from solid lubricant starting materials. Examples of solid lubricants may include, but are not limited to, layered materials such as, for example, chalcogenides, like molybdenum disulfide, tungsten disulfide, or a combination thereof. Other suitable layered materials include graphite or intercalated graphite. Other solid lubricants that may be used alone or in combination with the layered materials include, but are not limited to polytetrafluoroethylene (e.g., Teflon®), hexagonal boron nitride, soft metals (such as, for example, silver, lead, nickel, copper), cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, or a combination thereof. Fluorinated carbons may be, without limitation, carbon-based materials such as graphite which has been fluorinated to improve its aesthetic characteristics. Such materials may include, for example, a material such as $CF_x$ wherein x ranges from about 0.05 to about 1.2. Such a material is produced, for example, by Allied Chemical under the trade name Accufluor.

The methods of making the lubricant nanoparticles encapsulated and/or intercalated with the organic medium may include, for example, the milling of a solid lubricant feed material. In various embodiments, the solid lubricant feed material may be capable of being milled to particles comprising an average primary particle size of about 500 nanometers (submicron size) to about 10 nanometers. The particles may have an average primary particle size of less than or equal to about 500 nanometers, less than or equal to about 100 nanometers, less than or equal to about 75 nanometers, and less than or equal to about 50 nanometers. Alternatively, the milling may result in milled lubricant particles comprising a mixture, the mixture comprising particles having an average primary particle size of less than or equal to about 500 nanometers, plus larger particles. The milling may include, among other techniques, ball milling and chemo-mechanical milling. Examples of ball milling may include dry ball milling, wet ball milling, and combinations thereof. Ball milling may refer to an impaction process that may include two interacting objects where one object may be a ball, a rod, 4 pointed pins (jack shape), or other shapes. Chemo-mechanical milling may refer to an impaction process that may form an integrated complex between the organic medium and the nanoparticles. As a result of chemo-mechanical milling, the organic medium may coat, encapsulate, and/or intercalate the nanoparticles. In various embodiments, chemo-mechanical milling may be performed using a ball milling technique.

In various embodiments, the solid lubricant feed may be dry milled and then wet milled. An emulsifier may be mixed with a lubricant base material and added to the wet milled particles. Dry milling may refer to particles that have been milled in the presence of a vacuum, a gas, or a combination thereof. Wet milling may refer to particles that have been milled in the presence of a liquid.

As described above, the lubricant nanoparticle composition may further comprise an organic medium. Examples of organic mediums include, but are not limited to, oil mediums, grease mediums, alcohol mediums, or combinations thereof. Specific examples of organic mediums include, but are not limited to, composite oil, canola oil, vegetable oils, soybean oil, corn oil, ethyl and methyl esters of rapeseed oil, distilled monoglycerides, monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, n-hexadecane, hydrocarbon oils, phospholipids, or a combination thereof. Many of these organic media may be environmentally acceptable.

The compositions described in this specification may contain emulsifiers, surfactants, or dispersants. Examples of emulsifiers may include, but are not limited to, emulsifiers having a hydrophilic-lipophilic balance (HLB) from about 2 to about 7; a HLB from about 3 to about 5; or a HLB of about 4. Examples of emulsifiers may include, but are not limited to, lecithins, soy lecithins, phospholipids lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, or a combination thereof.

A method of making a composition, such as, for example, a lubricant additive or a primary lubricant formulation, is described. The composition may be used as an additive dispersed in a lubricant base material or as a component of a primary lubricant formulation. Examples of lubricant base materials may include, but are not limited to, oils, greases, plastics, gels, sprays, or a combination thereof. Specific examples of bases may include, but are not limited to, hydrocarbon oils, vegetable oils, corn oil, peanut oil, canola oil, soybean oil, mineral oil, paraffin oils, synthetic oils, petroleum gels, petroleum greases, hydrocarbon gels, hydrocarbon greases, lithium based greases, fluoroether based greases, ethylenebistearamide, waxes, silicones, or a combination thereof.

Described in this specification is a method of lubricating or coating an object that is part of an end application with a composition comprising hard particles, lubricant nanoparticles, and an organic medium. Further described is a method of lubricating an object by employing the composition comprising hard particles, lubricant nanoparticles, and an organic medium as a delivery or carrier mechanism.

In various embodiments, a catalyst delivery or carrier system comprises hard particles, lubricant nanoparticles, an organic medium, and a catalyst material. The catalyst material may be functionalized onto the surface of the hard particles, lubricant nanoparticles, or both. The catalyst material may be intercalated or otherwise integrated into the lubricant nanoparticles.

The compositions and methods described in this specification exhibit, among various advantages, enhanced dispersion stability, resistance to agglomeration, and corrosion resistance. FIG. 1 illustrates a method of preparing nanoparticle based lubricants or compositions. A solid lubricant feed is introduced via line 210 to a ball milling processor 215. Ball milling is carried out in the processor 215 and the solid lubricant feed is milled to comprise particles having an average primary particle size of less than or equal to about 1000 nanometers, less than or equal to about 500 nanometers, less than or equal to about 100 nanometers, less than or equal to about 80 nanometers, or less than or equal to about 50 nanometers. Alternatively, the ball milling may result in milled solid lubricant particles comprising a mixture, the mixture comprising particles having an average particle dimension of less than or equal to about 1000 nanometers or less than or equal to about 500 nanometers, plus larger particles. The ball milling may be high energy ball milling, medium energy ball milling, or combinations thereof. Additionally, in various embodiments the ball milling may be carried out in a vacuum, in the presence of a gas, in the presence of a liquid, in the presence of a second solid, or combinations thereof. The nanoparticle composition may be removed from the processor via line 220. The nanoparticle composition may be a nanoparticle based lubricant.

Figure 2:
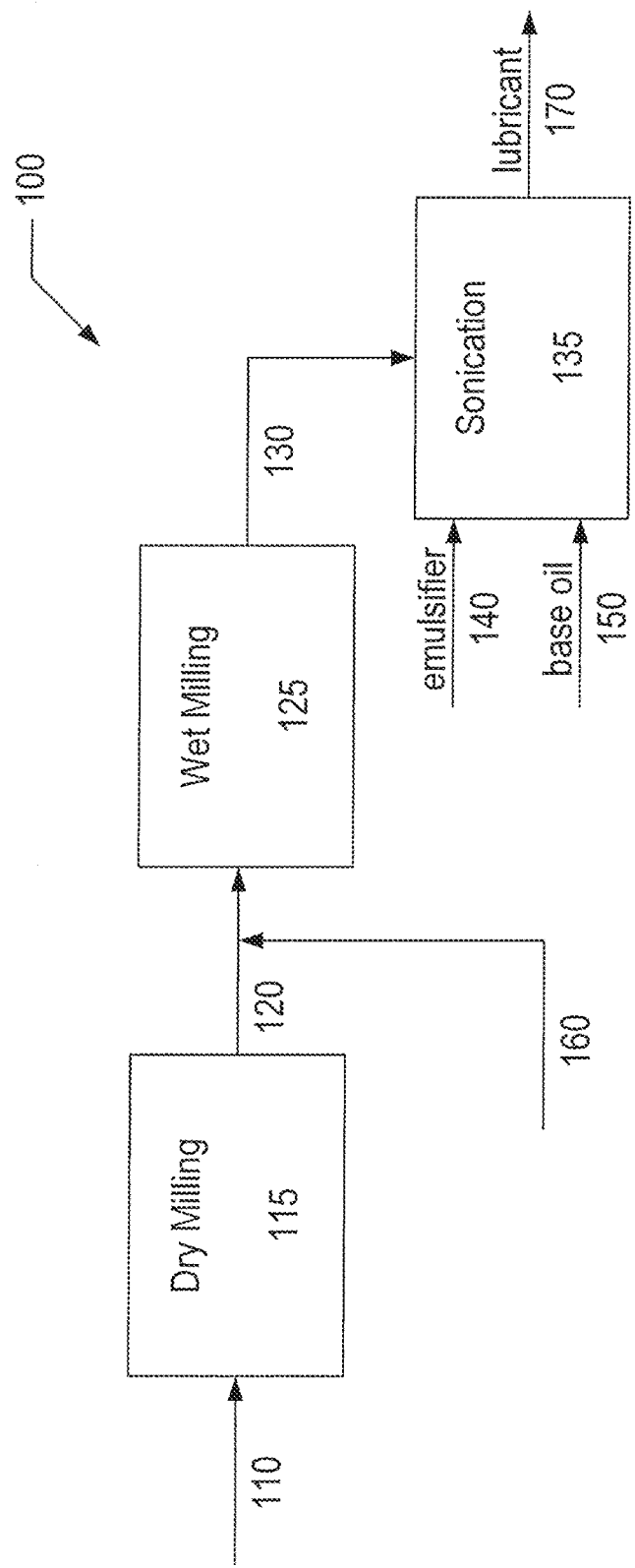
FIG. 2 is a diagram illustrating one method of preparing nanoparticle based lubricants.

In various embodiments, the ball milling may comprise a first ball milling and at least one more subsequent ball millings, or ball milling and/or other processing as appropriate. The ball milling may comprise dry milling followed by wet milling. FIG. 2 illustrates a further method 100 of preparing nanoparticle based lubricants and other compositions where dry milling is followed by wet milling. Feed 110 introduces a solid lubricant feed into a ball milling processor 115 where dry ball milling, such as in a vacuum or in air, reduces the solid lubricant feed to particles having an average dimension of the size described above. Line 120 carries the dry milled particles to a wet milling processor 125. Via line 160 the dry milled particles are combined with a composite oil or an organic medium prior to entering the wet milling processor 125. Alternatively, the organic medium and dry milled particles may be combined in the wet milling processor 125. In further alternative embodiments (not shown), the dry milling and wet milling may be carried out in a single processor where the organic medium is supplied to the single processor for wet milling after initially carrying out dry milling. In other alternative embodiments, the balls in the ball milling apparatus may be coated with the organic medium to incorporate the organic medium in the lubricant nanoparticles.

After wet milling, line 130 carries the wet milled particles to a container 135, which may be a sonication device. Alternatively, line 130 may carry a mixture comprising lubricant nanoparticles, organic medium, and a complex comprising the lubricant nanoparticles combined with an organic medium.

In another embodiment, prior to introduction of the wet milled particles into the container 135, a lubricant base material may be fed to the container 135 via line 150. Alternatively, the base may be supplied to the wet milling processor 125 and the mixing, which may include sonicating, may be carried out in the wet milling processor 125. In such embodiments the lubricant nanoparticle composition may be employed as an additive and dispersed in the lubricant base material. A lubricant base material may be paired with a lubricant nanoparticle composition according to the ability of the base material and the lubricant nanoparticle composition to blend appropriately. In such cases the lubricant nanoparticle composition may enhance the performance characteristics of the base.

In various embodiments, an emulsifier may be mixed with the lubricant base material. Emulsifiers may further enhance dispersion of the lubricant nanoparticle composition in the lubricant base material. The emulsifier may be selected to enhance the dispersion stability of a nanoparticle composition in a base. An emulsifier may also be supplied to the container 135 via line 140. In some embodiments, the emulsifier and base are combined in the container 135 prior to introduction of the wet milled particles. Prior mixing of the emulsifier with the base material may enhance dispersion upon addition of complexes of lubricant nanoparticles and organic medium and/or lubricant nanoparticles by homogeneously dispersing the complexes/nanoparticles. In some embodiments, the mixing of the emulsifier and base may comprise sonicating. The emulsifier may be supplied to the wet milling processor 125 and the mixing, which may include sonicating, may be carried out in the wet milling processor 125. The lubricant removed from the container 135 via line 120 may be a blend comprising the wet milled particles, organic medium, and base. The blend may further comprise an emulsifier.

In various embodiment, antioxidants or anticorrosion agents may be milled with the lubricant nanoparticles or added to prior milled lubricant nanoparticles. Examples of antioxidants include, but are not limited to, hindered phenols, alkylated phenols, alkyl amines, aryl amines, 2,6-di-tert-butyl-4-methylphenol, 4,4'-di-tert-octyldiphenylamine, tert-Butyl hydroquinone, tris(2,4-di-tert-butylphenyl)phosphate, phosphites, thioesters, or combinations of any thereof. Examples of anticorrosion agents include, but are not limited to, alkaline-earth metal bisalkylphenolsulphonates, dithiophosphates, alkenylsuccinic acid half-amides, or combinations of any thereof. In various embodiments, biocidals may be milled with the lubricant nanoparticles or added to prior milled lubricant nanoparticles. Examples of biocidals may include, but are not limited to, alkyl or hydroxylamine benzotriazole, an amine salt of a partial alkyl ester of an alkyl, alkenyl succinic acid, or a combination thereof.

In various embodiments, further processing of wet milled particles may comprise removal of oils that are not a part of a complex with the solid lubricant particles. Such methods may be suitable for applications that benefit from use of dry particles of solid lubricant, such as coating applications. Oil and/or other liquids can be removed from wet milled particles to produce substantially dry solid lubricant particles and complexes having intercalated organic media. Such wet milling followed by drying may produce a lubricant with reduced tendency to agglomerate. In specific embodiments, an agent, such as acetone or other suitable solvent, may be added that dissolves oils that are not a part of a complex with the particles, followed by a drying process such as supercritical drying, to produce a substantially dry lubricant comprising particles treated by milling in an organic medium.

Ball milling conditions may vary and, in particular, conditions such as temperature, milling time, and size and materials of the balls and vials may be manipulated. In various embodiments, ball milling may be carried out from about 12 hours to about 50 hours, from about 36 hours to about 50 hours, from about 40 hours to about 50 hours, or for about 48 hours (±1 hour, ±2 hours, or ±3 hours). Ball milling may be conducted at room temperature or elevated temperatures. The benefits of increasing milling time may comprise at least one of increasing the time for the organic medium and lubricant nanoparticles to interact, integrate, and complex; and producing finer sizes, better yield of nanoparticles, more uniform shapes, and more passive surfaces. An example of ball milling equipment suitable for carrying out the described milling includes the SPEX CertiPrep model 8000D, along with hardened stainless steel vials and hardened stainless steel grinding balls, but any type of ball milling apparatus may be used. In some embodiments, a stress of 600-650 MPa, a load of 14.9 N, and a strain of $10^{-3}$-$10^{-4}$ per second may be used.

The proportions of the components in a nanoparticle based lubricant or other composition may contribute to performance of the composition, such as the composition's dispersion stability and ability to resist agglomeration. In wet milling, suitable ratios of lubricant nanoparticles to organic medium may be about 1 part particles to about 4 parts organic medium by weight, about 1 part particles to about 3 parts organic medium by weight, about 3 parts particles to about 8 parts organic medium by weight, about 2 parts particles to about 4 parts organic medium by weight, about 1 part particles to about 2 parts organic medium by weight, or about 1 part particles to about 1.5 parts organic medium by weight.

Suitable ratios of organic medium to emulsifier in a composition including the lubricant nanoparticles may be about 1 part organic medium to less than or equal to about 1 part emulsifier, about 1 part organic medium to about 0.5 parts emulsifier by weight, or from about 0.4 to about 1 part emulsifier for about 1 part organic medium by weight.

The amount of lubricant nanoparticle composition (by weight) sonicated or dispersed in a lubricant base materials may comprise from about 0.25% to about 5%, about 0.5% to about 3%, about 0.5% to about 2%, or about 0.75% to about 2%, based on total weight of the composition.

The amount of emulsifier (by weight) sonicated or dissolved in a lubricant base material, depending on the end application, shelf-life, and the like, may comprise from about 0.5% to about 10%, from about 4% to about 8%, from about 5% to about 6%, or from about 0.75% to about 2.25%, based on total weight of the composition.

The compositions described in this specification may be used, without limitation, as lubricants, coatings, delivery mechanisms, or combinations of any thereof. The compositions may be used, without limitation, as an additive dispersed in a base oil or other lubricant composition. The compositions may also be used, without limitation, to lubricate a boundary lubrication regime. A boundary lubrication regime may be a lubrication regime where the average lubricant film thickness may be less than the composite surface roughness and the surface asperities may come into contact with each other under relative motion. During the relative motion of two surfaces with lubricants in various applications, three different lubrication stages may occur, and the boundary lubrication regime may be the most severe condition in terms of temperature, pressure and speed. Mating parts may be exposed to severe contact conditions of high load, low velocity, extreme pressure (for example, 1-2 GPa), and high local temperature (for example, 150-300 degrees C.). The boundary lubrication regime may also exist under lower pressures and low sliding velocities or high temperatures. In the boundary lubrication regime, the mating surfaces may be in direct physical contact.

The compositions may further be used, without limitation, as a lubricant or coating in machinery applications, manufacturing applications, mining applications, aerospace applications, automotive applications, pharmaceutical applications, medical applications, dental applications, cosmetic applications, food product applications, nutritional applications, health related applications, bio-fuel applications or a combination thereof. Specific examples of uses in end applications include, without limitation, machine tools, bearings, gears, camshafts, pumps, transmissions, piston rings, engines, power generators, pin-joints, aerospace systems, mining equipment, manufacturing equipment, or a combination thereof. Further specific examples of uses may be, without limitation, as an additive in lubricants, greases, gels, compounded plastic parts, pastes, powders, emulsions, dispersions, or combinations thereof. The composition may also be used as a lubricant that employs the lubricant nanoparticle composition as a delivery mechanism in pharmaceutical applications, medical applications, dental applications, cosmetic applications, food product applications, nutritional applications, health related applications, bio-fuel applications, or a combination thereof. The various compositions and methods may also be used, without limitation, in hybrid inorganic-organic materials. Examples of applications using inorganic-organic materials, include, but are not limited to, optics, electronics, ionics, mechanics, energy, environment, biology, medicine, smart membranes, separation devices, functional smart coatings, photovoltaic and fuel cells, photocatalysts, new catalysts, sensors, smart microelectronics, micro-optical and photonic components and systems for nanophotonics, innovative cosmetics, intelligent therapeutic vectors that combined targeting, imaging, therapy, and controlled release of active molecules, and nanoceramic-polymer composites.

Figure 7:
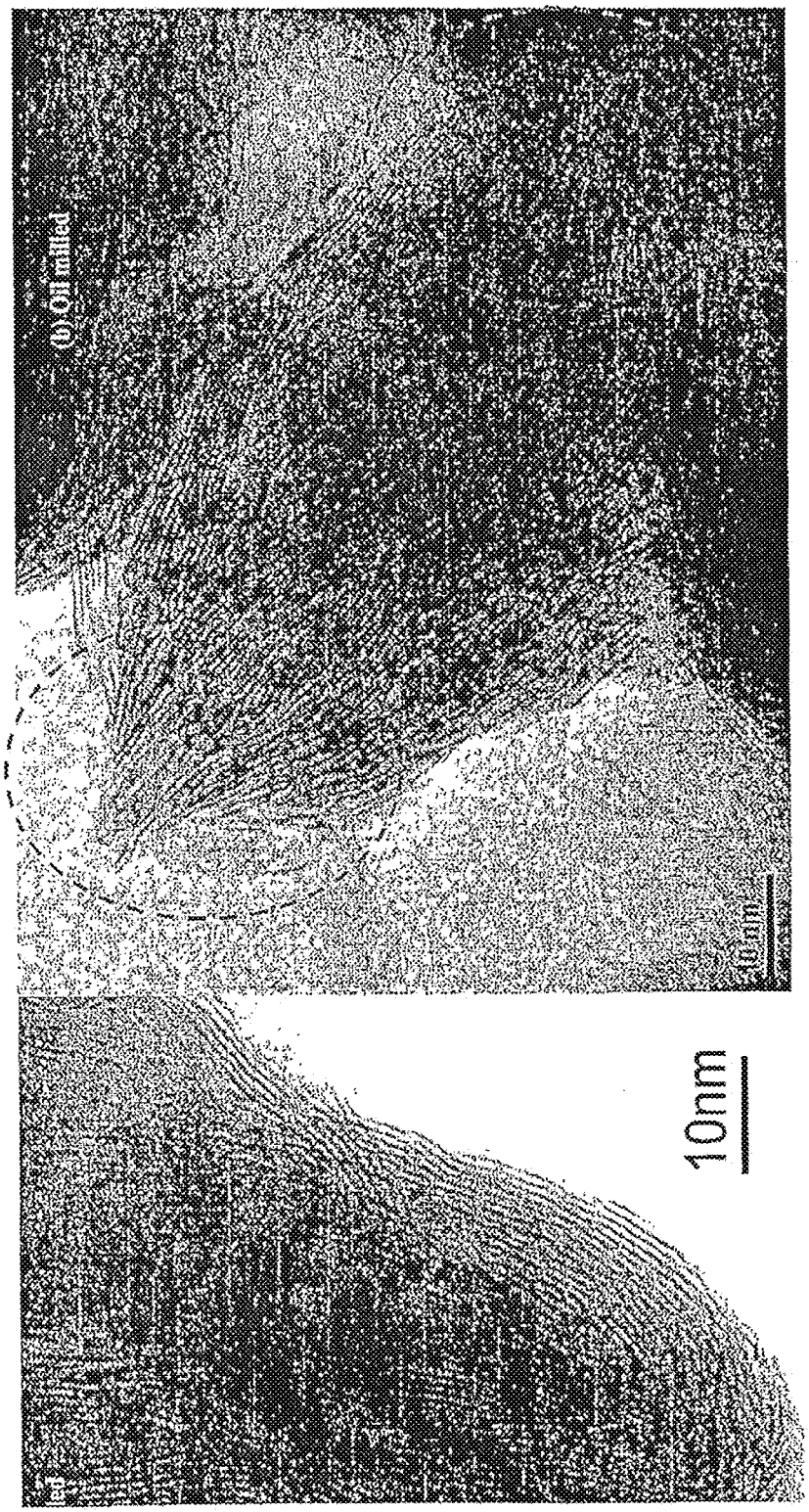
FIG. 7 is a TEM image showing the architecture of molybdenum disulfide nanoparticles (15-70 nm average size)

In some embodiments, the ball milling process may create a close caged dense oval shaped architecture (similar to a football shape or fullerene type architecture). This may occur when solid lubricant feed materials are milled in a gas or vacuum. FIG. 7(A) shows the close caged dense oval shaped architecture of molybdenum disulfide nanoparticles that have been ball milled in air for 48 hours.

In other embodiments, the ball milling process may create an open architecture (as described above), which may be encapsulated and/or intercalated with an organic medium. This may occur when solid lubricant feed materials are milled in a gas or vacuum followed by milling in an organic medium. FIG. 7(B) shows the open architecture of molybdenum disulfide nanoparticles that have been ball milled in air for 48 hours followed by ball milling in canola oil for 48 hours.

As shown in the examples, the tribological performance of the nanoparticle based lubricant may be improved. The tribological performance may be measured by evaluating different properties. An anti-wear property may be a lubricating fluid property that has been measured using the industry standard Four-Ball Wear (ASTM D4172) Test. The Four-Ball Wear Test may evaluate the protection provided by a lubricant under conditions of pressure and sliding motion. Placed in a bath of the test lubricant, three fixed steel balls may be put into contact with a fourth ball of the same grade in rotating contact at preset test conditions. Lubricant wear protection properties may be measured by comparing the average wear scars on the three fixed balls. The smaller the average wear scar, the better the protection. Extreme pressure properties may be lubricating fluid properties that have been measured using the industry standard Four-Ball Wear (ASTM D2783) Test. This test method may cover the determination of the load-carrying properties of lubricating fluids. The following two determinations may be made: 1) load-wear index (formerly Mean-Hertz load) and 2) weld load (kg). The load-wear index may be the load-carrying property of a lubricant. It may be an index of the ability of a lubricant to minimize wear at applied loads. The weld load may be the lowest applied load in kilograms at which the rotating ball welds to the three stationary balls, indicating the extreme pressure level that the lubricants can withstand. The higher the weld point scores and load wear index values, the better the anti-wear and extreme pressure properties of a lubricant. The coefficient of friction (COF) may be a lubricating fluid property that has been measured using the industry standard Four-Ball Wear (ASTM D4172) Test. COF may be a dimensionless scalar value which describes the ratio of the force of friction between two bodies and the force pressing them together. The coefficient of friction may depend on the materials used. For example, ice on metal has a low COF, while rubber on pavement has a high COF. A common way to reduce friction may be by using a lubricant which is placed between two surfaces.

The compositions described in this specification may have a wear scar diameter of about 0.4 mm to about 0.5 mm. The composition may have a COF of about 0.06 to about 0.08. The composition may have a weld load of about 150 kg to about 350 kg. The composition may have a load wear index of about 20 to about 40. The values of these tribological properties may change depending on the amount of lubricant nanoparticle composition sonicated or dissolved in the lubricant base material.

The non-limiting and non-exhaustive examples that follow are intended to further describe various non-limiting and non-exhaustive embodiments without restricting the scope of the embodiments described in this specification.

EXAMPLES

Example 1

Ball milling was performed in a SPEX 8000D machine using hardened stainless steel vials and balls. $MoS_2$ (Alfa Aesar, 98% pure, 700 nm average primary particle size) and canola oil (Crisco) were used as the starting materials in a ratio of 1 part $MoS_2$ (10 grams) to 2 parts canola oil (20 grams). The ball to powder weight ratio was 2 to 1. $MoS_2$ was ball milled for 48 hours in air followed by milling in canola oil for 48 hrs at room temperature. The nanoparticles were about 50 nm after ball milling. Table 1 summarizes milling conditions and resultant particle morphologies. It was observed that there was a strong effect of milling media on the shape of the ball milled nanoparticles. Dry milling showed buckling and folding of the planes when the particle size was reduced from micron size to nanometer size. However, the dry milling condition used here produced micro clusters embedding several nanoparticles. On the other hand, wet milling showed no buckling but saw de-agglomeration.

TABLE 1

Milling conditions and parametric effect on particle size and shape

| | Shape of the particles | Shape of the clusters |
|---|---|---|
| Dry Milling | | |
| 12 hours | Plate-like with sharp edges | Sharp and irregular |
| 24 hours | Plate-like with round edges | More or less rounded |
| 48 hours | Spherical | Globular clusters |
| Wet Milling | | |
| 12 hours | Thin plates with sharp edges | Thing plates with sharp edges |
| 24 hours | Thin plates with sharp edges | Thin plates with sharp edges |
| 48 hours | Thin plates with sharp edges | Thin plates with sharp edges |

TABLE 2

Effect of milling media on resultant size (starting size sub-micron), shape, and agglomeration of particles

| Properties | Dry | Alcohol | Oil | Dry milled and oil milled |
|---|---|---|---|---|
| Clusters size (nm) | 100 | 300 | 200 | 100 |
| Particle size (nm) | 30 | 80 | 80 | 30 |
| Agglomeration | High | Very less | Very less | Very less |
| Shape of the particles | Spherical | Platelet | Platelet | Spherical |

Figure 3:
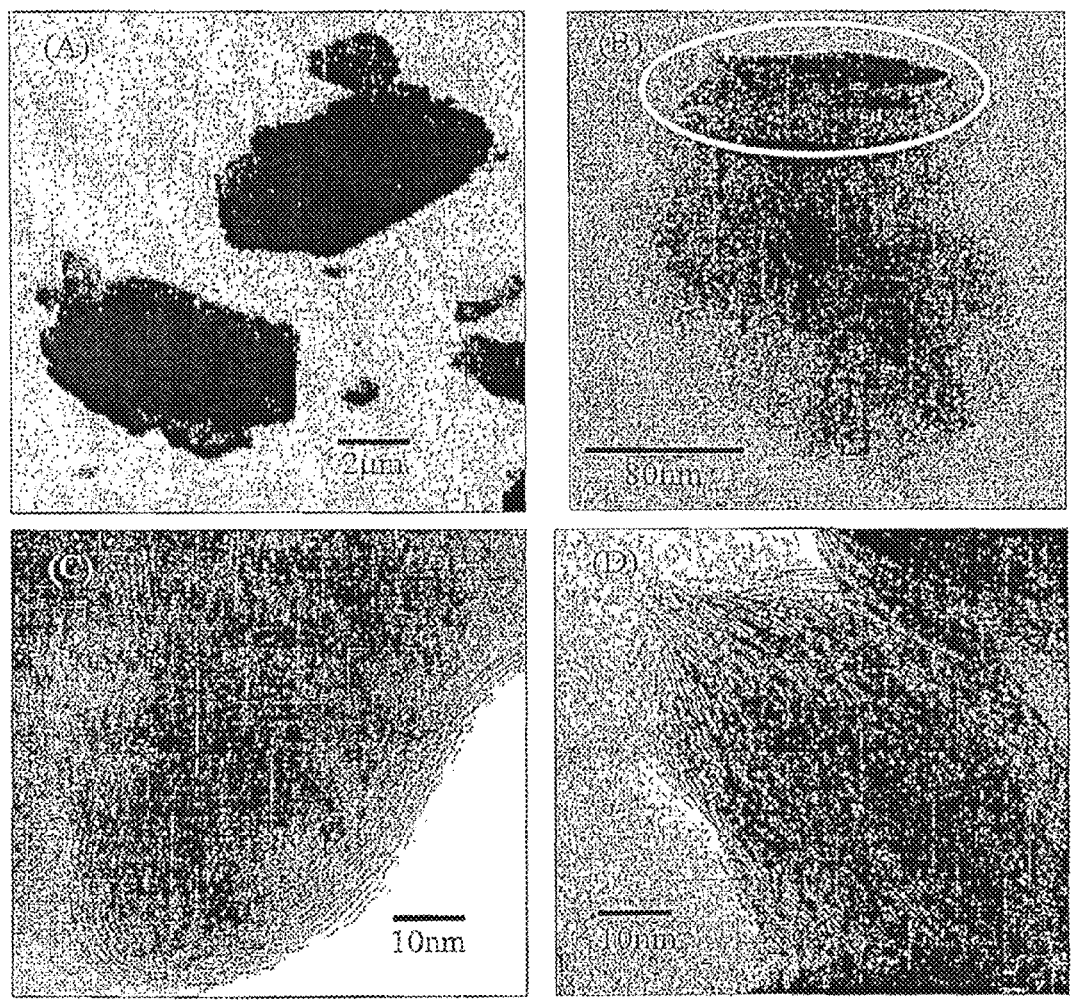
FIG. 3 shows transmission electron microscopy (TEM) micrographs of molybdenum disulfide particles.

FIG. 3 shows TEM micrographs of the as-available (700 nm), air milled, and hybrid milled (48 hrs in air medium followed by 48 hours in oil medium) $MoS_2$ nanoparticles. FIG. 3(A) represents micron-sized particle chunks of the as-available $MoS_2$ sample off the shelf. These micrographs, particularly FIG. 3(B), represent agglomerates of lubricant nanoparticles when milled in the air medium. FIG. 3(B) clearly demonstrates size reduction in air milled $MoS_2$. Higher magnification (circular regions) revealed formation of the disc shaped nanoparticles after milling in the air medium. From FIGS. 3(C) and 3(D) it may be concluded that the particle size was reduced to less than 30 nm after milling in air and hybrid conditions. Regardless of the occasionally observed clusters, the average size of the clusters is less than or equal to 200 nm.

Hybrid milled samples were dispersed in paraffin oil (from Walmart) and remained suspended without settling. However, the dispersion was not uniform after a few weeks. To stabilize the dispersion and extend the anti-wear properties, phospholipids were added. Around 2% by weight of soy lecithin phospholipids (from American Lecithin) was added in the base oil.

Figure 4:
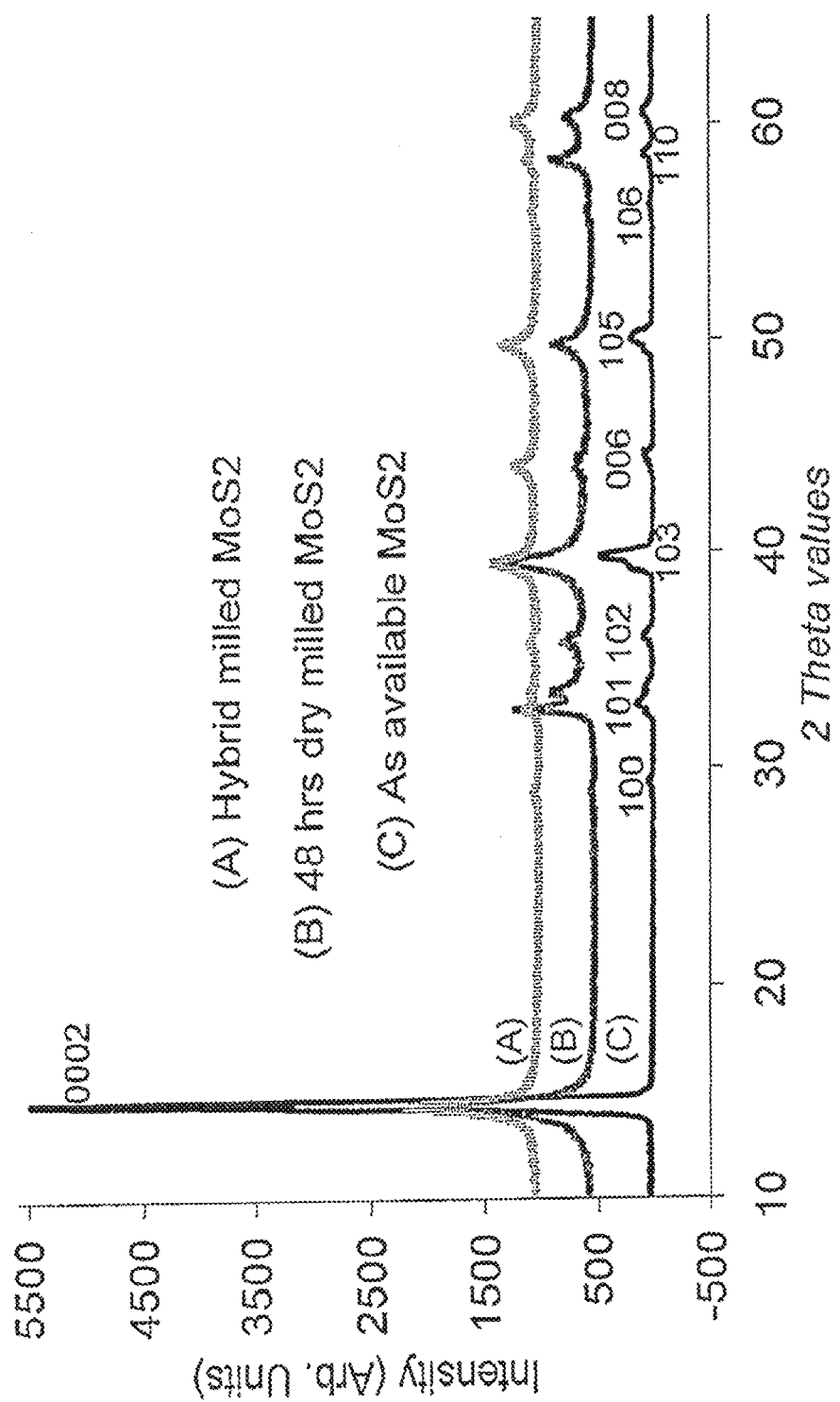
FIG. 4 is a graph showing XRD spectra of molybdenum disulfide particles.
Figure 5:
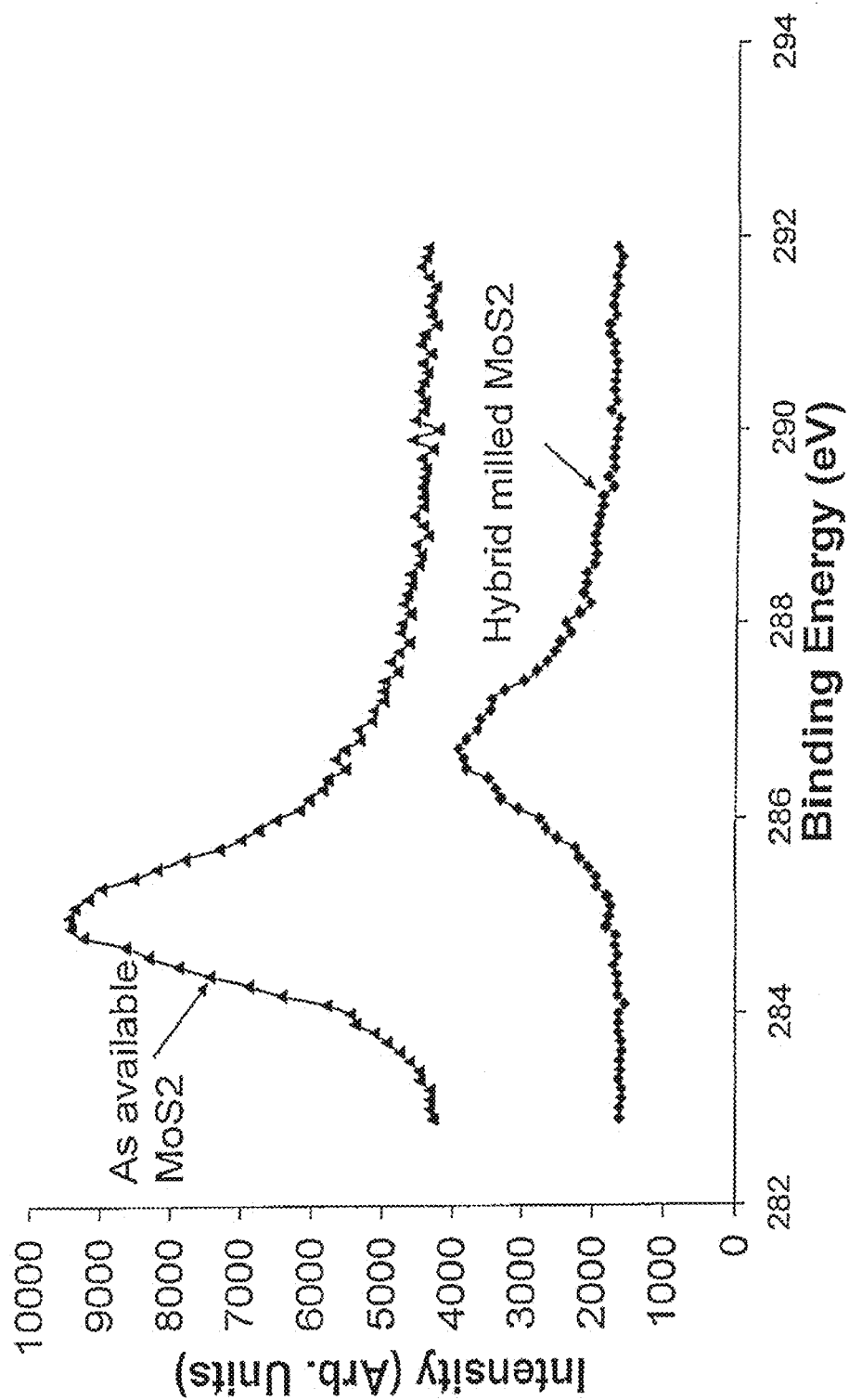
FIG. 5 is a graph showing XPS spectra of molybdenum disulfide particles in which the carbon peak for molybdenum disulfide that has not been ball milled is shown, as well as the carbon peak for molybdenum disulfide that has been ball milled in air for 48 hours, followed by ball milling in oil for 48 hours.

FIGS. 4 and 5 show the XRD and XPS spectra of $MoS_2$ before and after ball milling, respectively. XRD spectra revealed no phase change as well as no observable amorphization in the $MoS_2$ after milling. This observation is consistent with the continuous platelets observed throughout the nanoparticle matrix in TEM analysis for milled material. Broadening of peaks (FWHM) was observed in XRD spectra of $MoS_2$ ball milled in air and hybrid media, respectively. The peak broadening may be attributed to the reduction in particle size. The estimated grain size is 6 nm. This follows the theme of ball milling where clusters consist of grains and sub-grains of the order of 10 nm. XPS analysis was carried out to study the surface chemistry of the as-available and hybrid milled $MoS_2$ nanoparticles. As shown in FIG. 5, a carbon (C) peak observed at 285 eV in the as-available $MoS_2$ sample shifted to 286.7 eV. Bonding energies of 286 eV and 287.8 eV correspond to C—O and C═O bond formation, respectively. The observed binding energy level may demonstrate that a thin layer containing mixed C—O and C═O groups encapsulates the $MoS_2$ particles.

Preliminary tribological tests on the synthesized nanoparticles were performed on a four-ball machine by following ASTM 4172. The balls used were made of AISI 52100 stainless steel and were highly polished. Four Ball Wear Scar measurements using ASTM D4172 were made under the following test conditions:

| Test Temperature, ° C. | 75 (±1.7) |
|---|---|
| Test Duration, min | 60 (±1) |
| Spindle Speed, rpm | 1,200 (±60) |
| Load, kg | 40 (±0.2) |

Wear scar diameter (WSD, m) of each stationary ball was quantified in both vertical and horizontal directions. The average value of WSD from 3 independent tests was reported within ±0.03 mm accuracy.

Four Ball Extreme Pressure measurements using ASTM D2783 were made under the following test conditions:

| Test Temperature, ° C. | 23 |
|---|---|
| Test Duration, min | 60 (±1) |
| Spindle Speed, rpm | 1,770 (±60) |
| Load, kg | Varies, 10-sec/stage |
| Ball Material | AISI-E52100 |
| Hardness | 64-66 |
| Grade | 25EP |

Figure 6A:
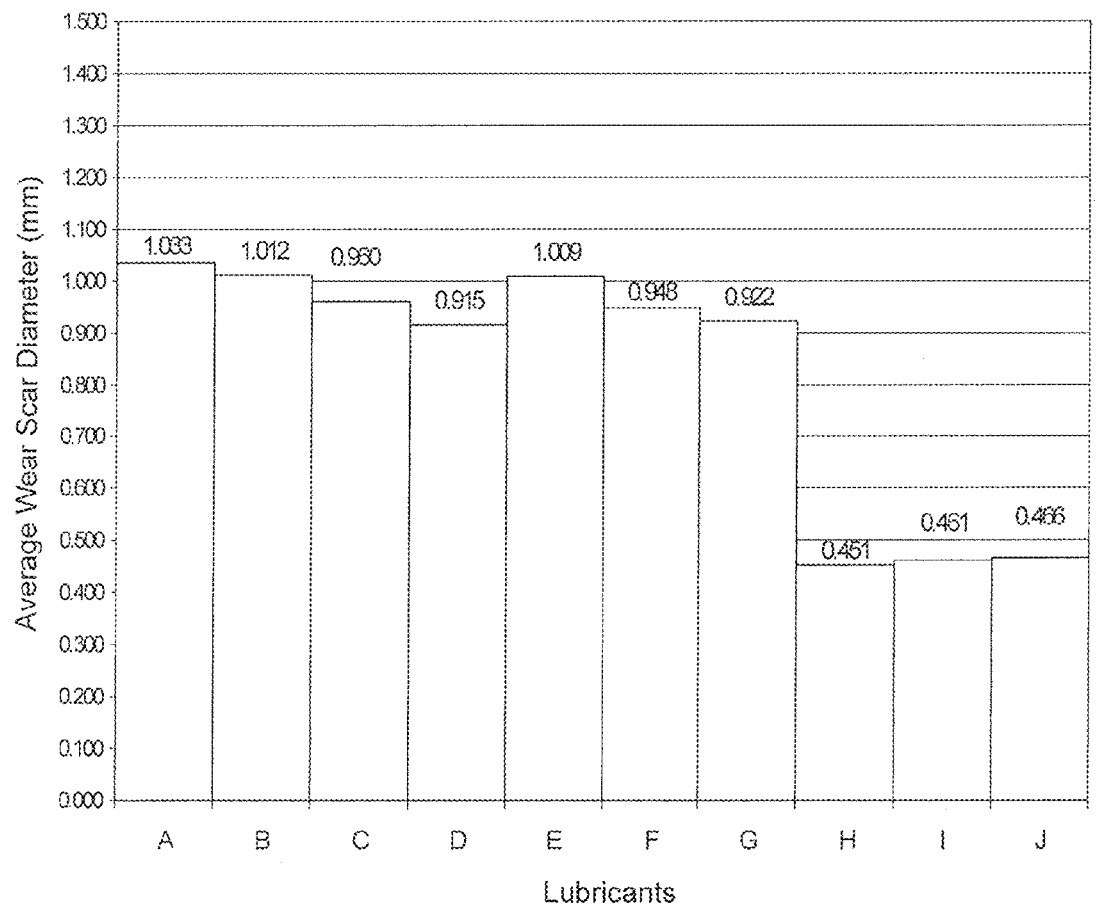
FIGS. 6(A)-6(D) show graphs and bar charts depicting tribological test data for different additives in paraffin oil.
Figure 6B:
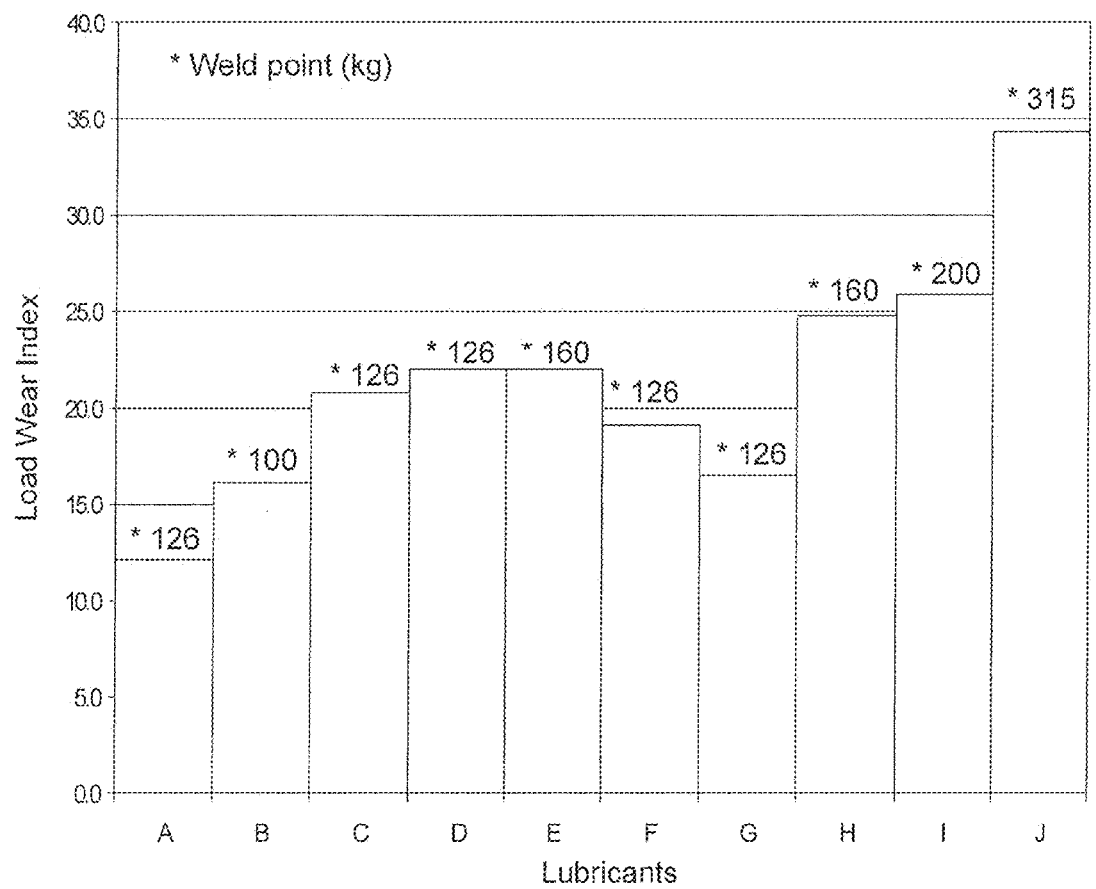
Figure 6C:
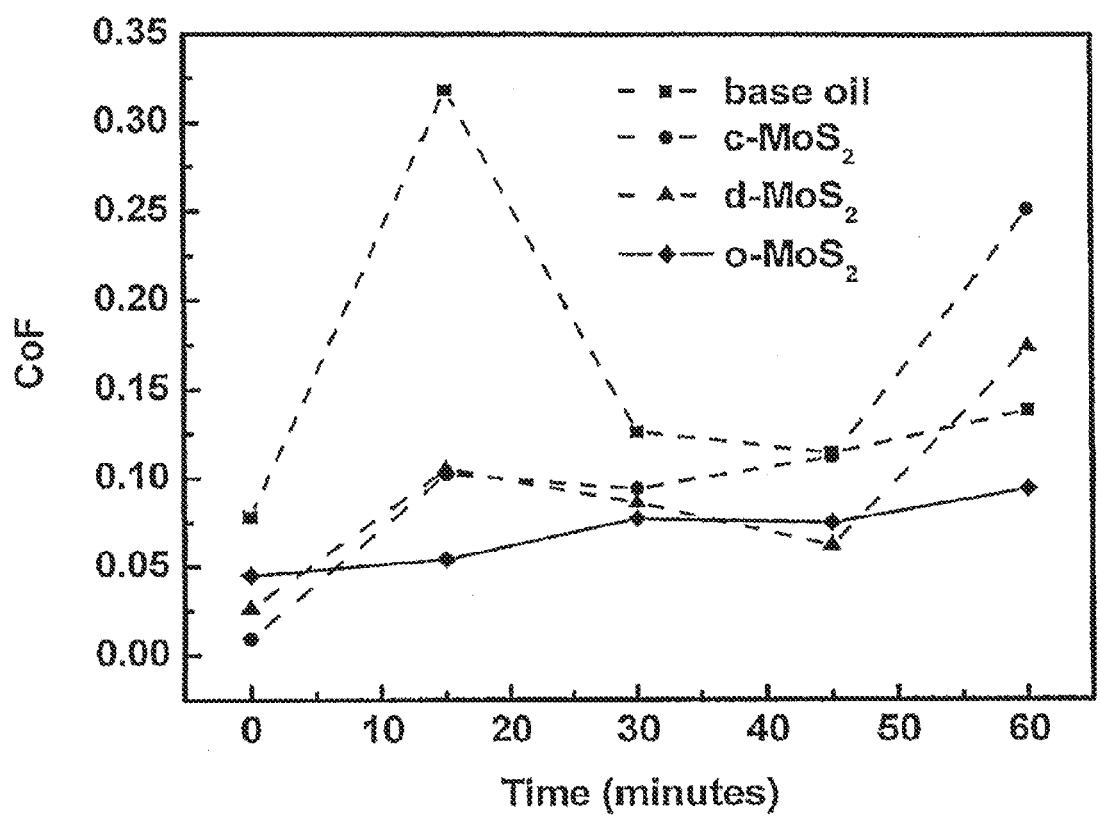
Figure 6D:
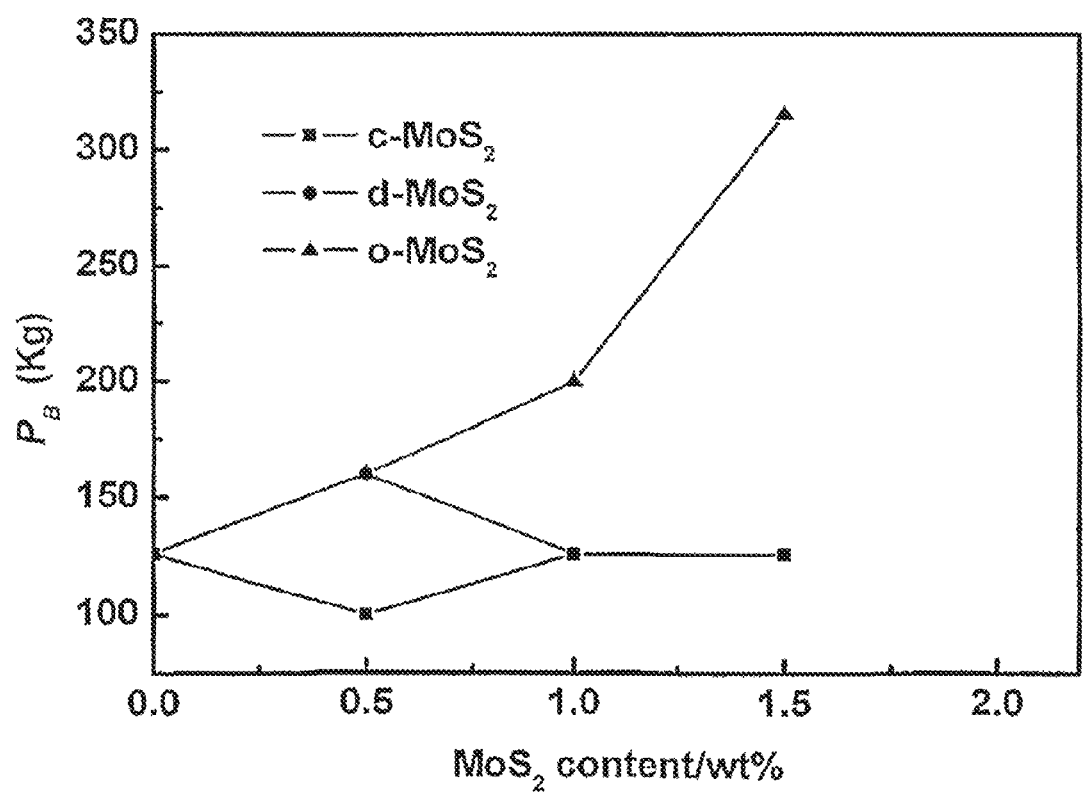

Three different particles (in w/w ratio) were evaluated for their anti-wear properties as additives in paraffin oil. FIG. 6(A) shows the average wear scar measurements for paraffin oil without a nanoparticle additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. FIG. 6(B) shows the load wear index for paraffin oil without a nanoparticle additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. FIG. 6(C) shows the COF for paraffin oil without a nanoparticle additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. FIG. 6(D) shows the extreme pressure data for paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. In each test the nanoparticle additive was present in the amount of 1% by weight.

Test Data from Nanoparticle Composition Additive in Base Oil

| Lubricant | Four Ball Tests at 40 kg Load | | Four Ball Extreme Pressure (ASTM D-2783) | | |
|---|---|---|---|---|---|
| All dispersions diluted to x % by wt. in reference base oil | (ASTM D4172) | | Weld Load | Load Wear | FIG. 6(A) and 6(b) |
| | WSD (mm) | COF | (kg) | Index | |
| Paraffin oil | 1.033 | 0.155 | 126 | 12.1 | A |
| Nanoparticles of $MoS_2$ without organic medium (0.5%) | 1.012 | 0.102 | 100 | 16.1 | B |

-continued

| Lubricant All dispersions diluted to x % by wt. in reference base oil | Four Ball Tests at 40 kg Load (ASTM D4172) | | Four Ball Extreme Pressure (ASTM D-2783) | | FIG. 6(A) and 6(b) |
|---|---|---|---|---|---|
| | WSD (mm) | COF | Weld Load (kg) | Load Wear Index | |
| Nanoparticles of MoS$_2$ without organic medium (1.0%) | 0.960 | 0.114 | 126 | 20.8 | C |
| Nanoparticles of MoS$_2$ without organic medium (1.5%) | 0.915 | 0.098 | 126 | 22.0 | D |
| Conventional available micro particles (0.5%) | 1.009 | 0.126 | 160 | 22.0 | E |
| Conventional available micro particles (1.0%) | 0.948 | 0.091 | 126 | 19.1 | F |
| Conventional available micro particles (1.5%) | 0.922 | 0.106 | 126 | 16.5 | G |
| Nanoparticles of MoS$_2$ with organic medium (0.5%) | 0.451 | 0.077 | 160 | 24.8 | H |
| Nanoparticles of MoS$_2$ with organic medium (1.0%) | 0.461 | 0.069 | 200 | 25.9 | I |
| Nanoparticles of MoS$_2$ with organic medium (1.5%) | 0.466 | 0.075 | 315 | 34.3 | J |

Figure 8:
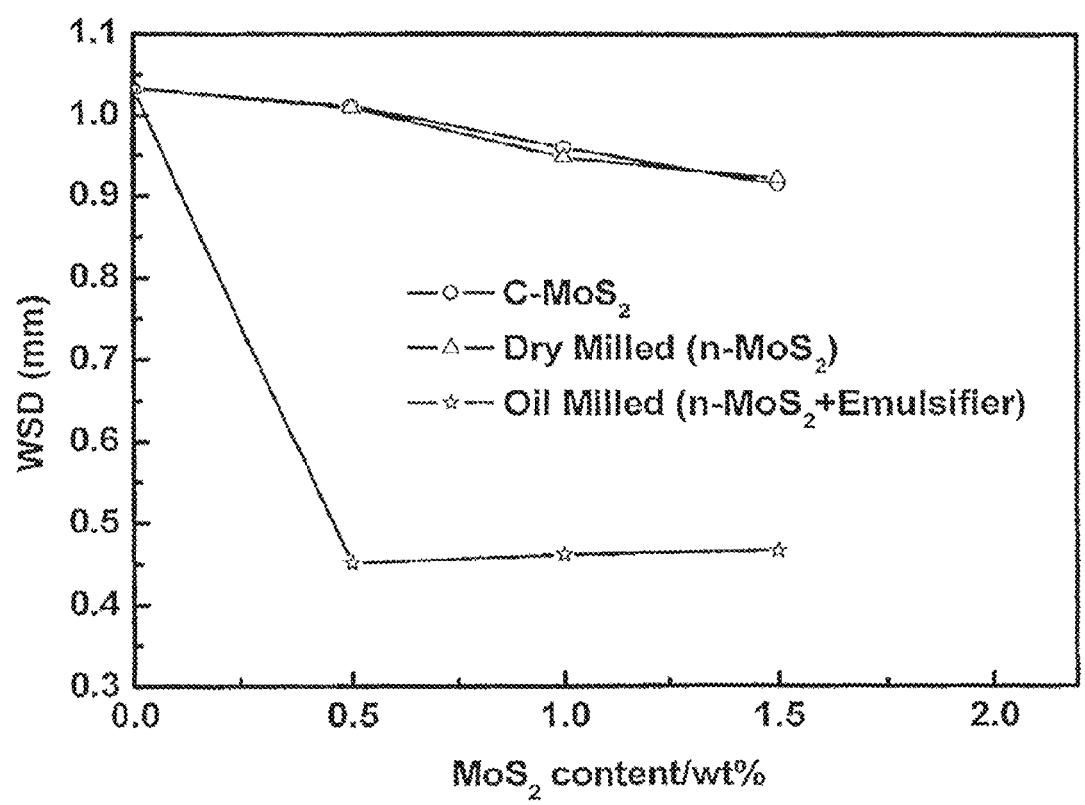
FIG. 8 is a graph depicting a comparison of wear scar diameters for different additives in paraffin oil; one additive is crystalline molybdenum disulfide (c-MoS$_2$); another is molybdenum disulfide nanoparticles that were ball milled in air (n-MoS$_2$); another additive is molybdenum disulfide nanoparticles that were ball milled in air followed by ball milling in canola oil and to which a phospholipid emulsifier was added (n-MoS$_2$+Emulsifier)

Comparison of wear scar diameters for different additives in paraffin oil are graphically depicted in FIG. 8. One additive is crystalline molybdenum disulfide (c-MoS2). Another additive is molybdenum disulfide nanoparticles that were ball milled in air (n-MoS2). Another additive is molybdenum disulfide nanoparticles that were ball milled in air followed by ball milling in canola oil and to which a phospholipid emulsifier was added (n-MoS2+Emulsifier).

Figure 9:
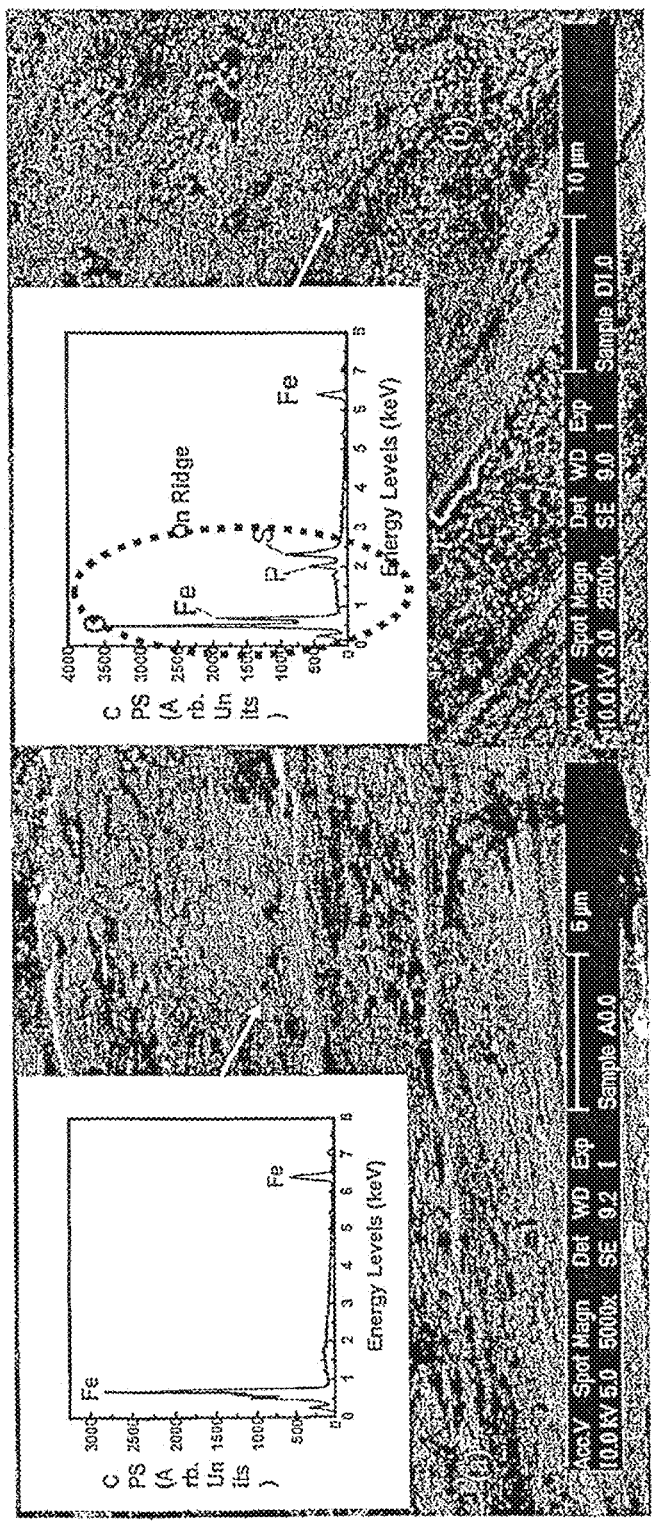
FIG. 9 shows photographs and graphs produced using energy dispersive x-ray analysis (EDS) depicting the chemical analysis of wear scar diameters in four-ball tribological testing for nanoparticle based lubricants.

The transfer film in the wear scar, studied using energy dispersive x-ray analysis (EDS), identified the signatures of phosphates in addition to molybdenum and sulfur. FIG. 9(a) depicts the base case of paraffin oil without a nanoparticle additive. FIG. 9(b) depicts paraffin oil with the molybdenum disulfide nanoparticles and the emulsifier. It shows the early evidences of molybdenum (Mo)-sulfur (S)-phosphorous (P) in the wear track. Iron (Fe) is seen in FIGS. 9(a) and 9(b), as it is the material of the balls (52100 steel) in the four-ball test. The molybdenum and sulfur peaks coincide and are not distinguishable because they have the same binding energy. Elemental mapping also showed similar results.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification. In this manner, Applicant reserves the right to amend the claims during prosecution to add features as variously described in this specification, and such amendments comply with the requirements of 35 U.S.C. §§ 112(a) and 132(a).

What is claimed is:

1. A composition comprising:
   a plurality of hard particles;
   a plurality of lubricant nanoparticles having an average particle size of less than or equal to about 500 nm and an open architecture; and
   an organic medium intercalated in the lubricant nanoparticles.

2. The composition of claim 1, wherein the hard particles comprise at least one of a metal boride, a metal carbide, a metal nitride, a metal oxide, a metal silicide, a solid state solution of any thereof, or a particulate mixture of any thereof.

3. The composition of claim 1, wherein the hard particles comprise at least one of a metal boride, a metal carbide, a metal nitride, a metal oxide, a metal silicide, a solid state solution of any thereof, or a particulate mixture of any thereof, wherein the metal comprises at least one element selected from groups IIIA, IVB, VB, and VIB of the periodic table.

4. The composition of claim 1, wherein the hard particles comprise at least one of a metal boride, a metal carbide, a metal nitride, a metal oxide, a metal silicide, a solid state solution of any thereof, or a particulate mixture of any thereof, wherein the metal comprises at least one element selected from the group consisting of titanium, zirconium, hafnium, vanadium, niobium, tantalum, chromium, molybdenum, and tungsten.

5. The composition of claim 1, wherein the hard particles comprise at least one of synthetic diamond, natural diamond, amorphous carbon, or nanocrystalline carbon.

6. The composition of claim 5, wherein the synthetic diamond particles or the natural diamond particles comprise polycrystalline diamond.

7. The composition of claim 1, wherein the hard particles comprise at least one metal carbide.

8. The composition of claim 7, wherein the hard particles comprise at least one metal carbide selected from the group consisting of tungsten carbides, molybdenum carbides, chromium carbides, tantalum carbides, niobium carbides, vanadium carbides, hafnium carbides, zirconium carbides, titanium carbides, boron carbides, silicon carbides, solid state solutions of any thereof, and particulate mixtures of any thereof.

9. The composition of claim 1, wherein the hard particles comprise at least one metal nitride.

10. The composition of claim 9, wherein the hard particles comprise at least one metal nitride selected from the group consisting of cubic boron nitrides, silicon nitrides, titanium nitrides, zirconium nitrides, hafnium nitrides, tungsten nitrides, solid state solutions of any thereof, and particulate mixtures of any thereof.

11. The composition of claim 1, wherein the hard particles comprise at least one metal oxide.

12. The composition of claim 11, wherein the hard particles comprise at least one metal oxide selected from the group consisting of aluminum oxides, cerium oxides, titanium oxides, zirconium oxides, solid state solutions of any thereof, and particulate mixtures of any thereof.

13. The composition of claim 1, wherein the hard particles comprise at least one metal boride.

14. The composition of claim 13, wherein the hard particles comprise at least one metal boride selected from the group consisting of titanium diboride, zirconium diboride, hafnium diboride, tantalum borides, tungsten borides, silicon borides, solid state solutions of any thereof, and particulate mixtures of any thereof.

15. The composition of claim 1, wherein the hard particles comprise at least one metal carbonitride.

16. The composition of claim 15, wherein the hard particles comprise at least one metal carbonitride selected from the group consisting of boron carbonitrides, silicon carbonitrides, titanium carbonitrides, zirconium carbonitrides, hafnium carbonitrides, tungsten carbonitrides, solid state solutions of any thereof, and particulate mixtures of any thereof.

17. The composition of claim 1, wherein the hard particles have an average particle size of less than or equal to 500 nm.

18. The composition of claim 1, wherein the lubricant nanoparticles have an average particle size of less than or equal to 100 nm.

19. The composition of claim 1, wherein the lubricant nanoparticles are intercalated and encapsulated with the organic medium.

20. The composition of claim 1, wherein the lubricant nanoparticles are selected from the group consisting of molybdenum disulfide nanoparticles, tungsten disulfide nanoparticles, hexagonal boron nitride nanoparticles, graphite nanoparticles, and combinations of any thereof.

21. The composition of claim 1, wherein the lubricant nanoparticles comprise molybdenum disulfide nanoparticles.

22. The composition of claim 1, wherein the organic medium comprises at least one material selected from the group consisting of oil mediums, grease mediums, alcohol mediums, composite oils, canola oil, vegetable oil, soybean oil, corn oil, rapeseed oil, ethyl and methyl esters of rapeseed oil, monoglycerides, distilled monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, and combinations of any thereof.

23. The composition of claim 1, wherein the organic medium comprises an oil medium selected from the group consisting of a composite oil, canola oil, vegetable oil, soybean oil, corn oil, a hydrocarbon oil, a mineral oil, and combinations of any thereof.

24. The composition of claim 1, wherein the organic medium comprises a vegetable oil.

25. The composition of claim 1, further comprising a solid lubricant material in addition to the lubricant nanoparticles, wherein the solid lubricant material is selected from the group consisting of polytetrafluoroethylene, soft metals, silver, lead, nickel, copper, cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, and combinations of any thereof.

26. The composition of claim 25, wherein the additional solid lubricant material comprises nanoparticles having an average particle dimension of less than or equal to about 500 nm.

27. The composition of claim 1, further comprising a base lubricant material, wherein the hard particles and the lubricant nanoparticles are dispersed in the base lubricant material.

28. The composition of claim 27, wherein the base lubricant material comprises at least one material selected from the group consisting of an oil, a grease, a plastic, a gel, a wax, a silicone, a hydrocarbon oil, a vegetable oil, corn oil, peanut oil, canola oil, soybean oil, a mineral oil, a paraffin oil, a synthetic oil, a petroleum gel, a petroleum grease, a hydrocarbon gel, a hydrocarbon grease, a lithium based grease, a fluoroether based grease, ethylenebistearamide, and combinations of any thereof.

29. The composition of claim 27, wherein the base lubricant material comprises at least one material selected from the group consisting of an oil, a grease, a plastic, a gel, a paste, a wax, a silicone, and combinations of any thereof.

30. The composition of claim 27, wherein the base lubricant material comprises an oil or a grease.

31. The composition of claim 27, wherein the base lubricant material comprises at least one material selected from the group consisting of a mineral oil, a paraffin oil, a synthetic oil, a petroleum grease, a hydrocarbon grease, a lithium based grease, and combinations of any thereof.

32. The composition of claim 1, further comprising an emulsifier.

33. The composition of claim 32, wherein the emulsifier comprises at least one material selected from the group consisting of lecithins, phospholipids, soy lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, and combinations of any thereof.

34. The composition of claim 32, wherein the emulsifier comprises a compound containing phosphorous.

35. The composition of claim 34, wherein the emulsifier comprises a phospholipid.

36. The composition of claim 34, wherein the emulsifier comprises a lecithin.

37. The composition of claim 1, further comprising an antioxidant.

38. The composition of claim 34, wherein the antioxidant comprises at least one material selected from the group consisting of hindered phenols, alkylated phenols, alkyl amines, aryl amines, 2,6-di-tert-butyl-4-methylphenol, 4,4'-di-tert-octyldiphenylamine, tert-butyl hydroquinone, tris(2,4-di-tert-butylphenyl)phosphate, phosphites, thioesters, and combinations of any thereof.

39. The composition of claim 1, further comprising an anticorrosion agent.

40. The composition of claim 39, wherein the anticorrosion agent comprises at least one material selected from the group consisting of alkaline earth metal bisalkylphenolsulphonates, dithiophosphates, alkenyl succinic acid halfamides, and combinations thereof.

41. The composition of claim 1, further comprising at least one biocidal.

42. The composition of claim 41, wherein the biocidal comprises at least one material selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, and combinations of any thereof.

43. The composition of claim 1, wherein the lubricant nanoparticles are functionalized with a catalyst.

44. The composition of claim 1, wherein the lubricant nanoparticles are functionalized with a dispersant agent.

45. The composition of claim 1, wherein the hard particles are functionalized with a catalyst.

46. The composition of claim 1, wherein the hard particles are functionalized with a dispersant agent.

47. A lubricant comprising the composition of claim 1.

48. A composition comprising:
a plurality of hard particles;
a plurality of molybdenum disulfide nanoparticles having an average particle size of less than or equal to about 100 nm and an open architecture; and
an oil medium intercalated in and encapsulating the molybdenum disulfide nanoparticles.

49. The composition of claim 48, wherein the oil medium is selected from the group consisting of a composite oil, canola oil, a vegetable oil, soybean oil, corn oil, a hydrocarbon oil, a mineral oil, and combinations of any thereof.

50. The composition of claim 48, wherein the organic medium comprises a vegetable oil.

51. The composition of claim 48, further comprising an emulsifier.

52. The composition of claim 51, wherein the emulsifier comprises a compound containing phosphorous.

53. The composition of claim 51, wherein the emulsifier comprises a phospholipid.

54. The composition of claim 51, wherein the emulsifier comprises a lecithin.

55. The composition of claim 48, further comprising a base lubricant material, wherein the hard particles and the molybdenum disulfide nanoparticles are dispersed in the base lubricant material.

56. The composition of claim 55, wherein the base lubricant material comprises at least one material selected from the group consisting of an oil, a grease, a plastic, a gel, a wax, a silicone, and combinations of any thereof.

57. The composition of claim 55, wherein the base lubricant material comprises an oil or a grease.

58. The composition of claim 55, wherein the base lubricant material comprises at least one oil selected from the group consisting of a mineral oil, a paraffin oil, a synthetic oil, a petroleum grease, a hydrocarbon grease, a lithium based grease, and combinations of any thereof.

59. The composition of claim 48, further comprising one or more of an antioxidant, an anticorrosion agent, a biocidal, and a solid lubricant material in addition to the molybdenum disulfide nanoparticles.

60. The composition of claim 48, wherein the hard particles comprise at least one of a metal boride, a metal carbide, a metal nitride, a metal oxide, a metal silicide, a solid state solution of any thereof, or a particulate mixture of any thereof, wherein the metal comprises at least one element selected from groups IIIA, IVB, VB, and VIB of the periodic table.

61. The composition of claim 48, wherein the hard particles have an average particle size of less than or equal to 500 nm.

* * * * *

UNITED STATES PATENT AND TRADEMARK OFFICE
CERTIFICATE OF CORRECTION

PATENT NO. : 9,902,918 B2
APPLICATION NO. : 14/302030
DATED : February 27, 2018
INVENTOR(S) : Ajay P. Malshe It is certified that error appears in the above-identified patent and that said Letters Patent is hereby corrected as shown below:

On the Title Page

Item (71), "AZ" should read --AR--.

Item (72), "AZ" should read --AR--.

Signed and Sealed this
Thirty-first Day of July, 2018

Andrei Iancu
*Director of the United States Patent and Trademark Office*